(12) United States Patent
Taylor

(10) Patent No.: US 11,047,437 B2
(45) Date of Patent: Jun. 29, 2021

(54) DISC BRAKE

(71) Applicant: Meritor Heavy Vehicle Braking Systems (UK) Limited, Gwent (GB)

(72) Inventor: Martin P. Taylor, Gwent (GB)

(73) Assignee: Meritor Heavy Vehicle Braking Systems (UK) Limited, Cwmbran (GB)

(*) Notice: Subject to any disclaimer, the term of this patent is extended or adjusted under 35 U.S.C. 154(b) by 199 days.

(21) Appl. No.: 16/040,772

(22) Filed: Jul. 20, 2018

(65) Prior Publication Data

US 2019/0024742 A1 Jan. 24, 2019

(30) Foreign Application Priority Data

Jul. 21, 2017 (EP) .................................. 17182678

(51) Int. Cl.
| | | |
|---|---|---|
| *F16D 65/56* | (2006.01) | |
| *F16D 65/00* | (2006.01) | |
| *F16D 65/18* | (2006.01) | |
| *F16D 55/226* | (2006.01) | |
| *F16D 55/00* | (2006.01) | |
| *F16D 121/02* | (2012.01) | |
| *F16D 121/14* | (2012.01) | |

(Continued)

(52) U.S. Cl.
CPC ......... *F16D 65/567* (2013.01); *F16D 55/226* (2013.01); *F16D 65/0025* (2013.01); *F16D 65/0081* (2013.01); *F16D 65/18* (2013.01); *F16D 65/183* (2013.01); *F16D 2055/002* (2013.01); *F16D 2055/0037* (2013.01); *F16D 2121/02* (2013.01); *F16D 2121/14* (2013.01); *F16D 2125/06* (2013.01); *F16D 2125/32* (2013.01)

(58) Field of Classification Search
CPC ...... F16D 65/14; F16D 65/567; F16D 55/226; F16D 65/0025; F16D 65/0081; F16D 65/18; F16D 65/183; F16D 2055/002; F16D 2055/0037; F16D 2121/02; F16D 2121/06; F16D 2125/32
See application file for complete search history.

(56) References Cited

U.S. PATENT DOCUMENTS 3,848,705 A * 11/1974 Burnett .................... F16D 65/18
188/71.9
4,491,203 A * 1/1985 Monick ................. F16D 65/567
188/196 BA (Continued)

FOREIGN PATENT DOCUMENTS

DE       10104158 A1   8/2002
DE       10260597 A1   7/2004

(Continued)

OTHER PUBLICATIONS

European Patent Office, Extended European Search Report for Application No. EP17182678.7-1012, dated Feb. 28, 2018, 7 pages.

*Primary Examiner* — Melanie Torres Williams
(74) *Attorney, Agent, or Firm* — Brooks Kushman PC

(57) ABSTRACT

A disc brake and an adjuster system for a disc brake. The adjuster system may include a piston, a manual rewind apparatus, and an overload device. The overload device may be arranged between the manual rewind device and the piston and may be configured to interrupt driving engagement between the manual rewind apparatus and the piston when torque is applied above a predetermined value.

20 Claims, 17 Drawing Sheets

(51) Int. Cl.
*F16D 125/06* (2012.01)
*F16D 125/32* (2012.01)

(56) References Cited

U.S. PATENT DOCUMENTS

| | | |
|---|---|---|
| 4,620,617 A | 11/1986 | Weber |
| 4,690,253 A | 9/1987 | Weber |
| 4,958,654 A | 9/1990 | Hoffman, Jr. et al. |
| 6,607,059 B1 | 8/2003 | Kapaan et al. |
| 6,659,236 B1 | 12/2003 | Clark et al. |
| 6,691,837 B1 | 2/2004 | Kapaan et al. |
| 7,204,351 B2 * | 4/2007 | Sandberg ............ F16D 65/0043 188/196 V |
| 9,599,177 B2 | 3/2017 | Yasui et al. |
| 2015/0354645 A1 | 12/2015 | Cann |

FOREIGN PATENT DOCUMENTS

| | | | |
|---|---|---|---|
| DE | 102006007684 A1 | 8/2007 | |
| DE | 102010011725 A1 | 9/2011 | |
| DE | 202007019600 U1 * | 4/2014 | ............ F16D 65/56 |
| DE | 102008037774 A1 | 6/2017 | |
| EP | 0190453 A2 | 8/1986 | |
| EP | 2602505 A1 | 6/2013 | |
| EP | 3051169 A1 | 8/2016 | |
| EP | 3179127 A1 | 6/2017 | |
| EP | 102008037774 A1 | 6/2017 | |
| GB | 2192033 A | 12/1987 | |
| GB | 2239067 A | 6/1991 | |
| GB | 2304387 A | 3/1997 | |
| GB | 2474301 A | 4/2011 | |
| JP | H11287267 A | 10/1999 | |
| WO | 2013083857 A2 | 6/2013 | |
| WO | 2015054935 A1 | 4/2015 | |

* cited by examiner

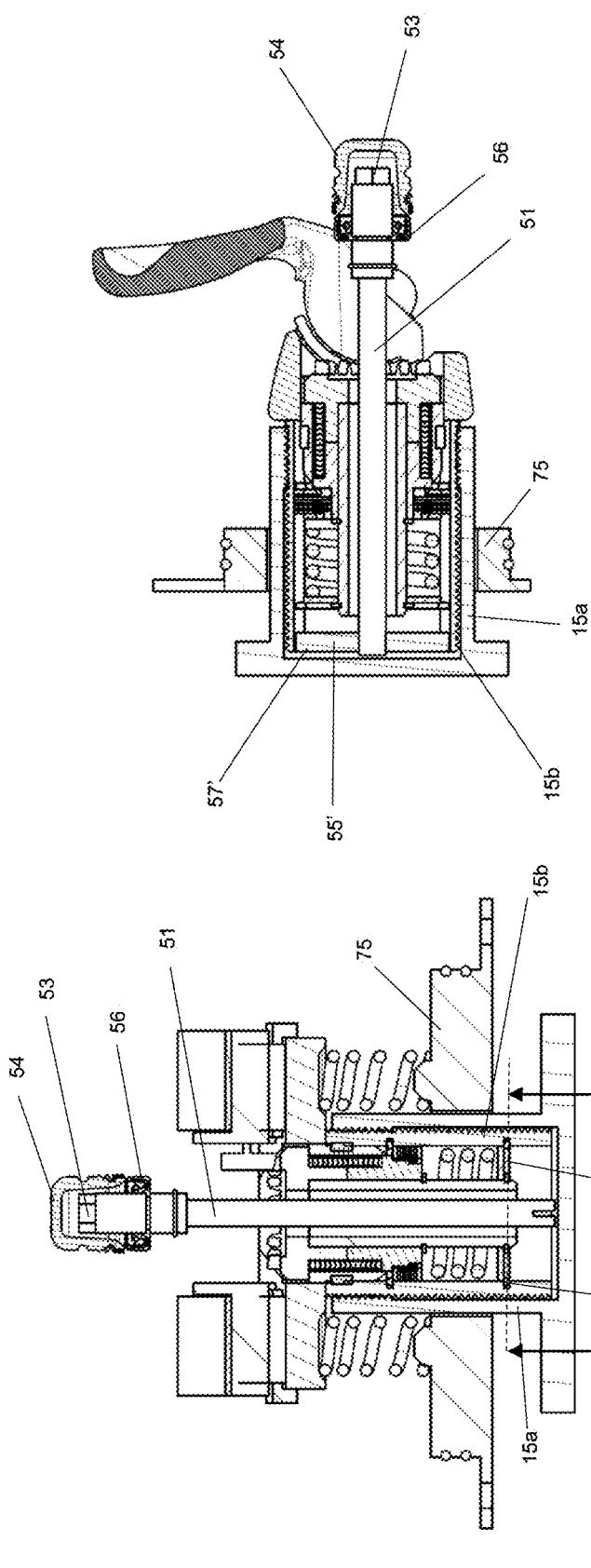
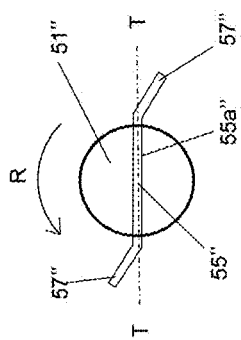
Figure 12b
Figure 12d
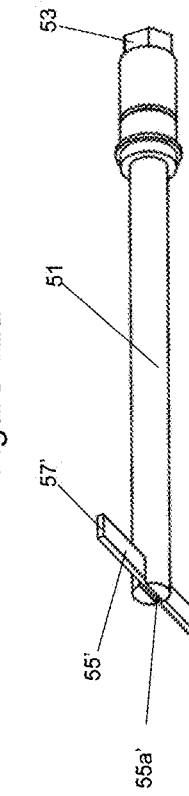
Figure 12a
Figure 12c

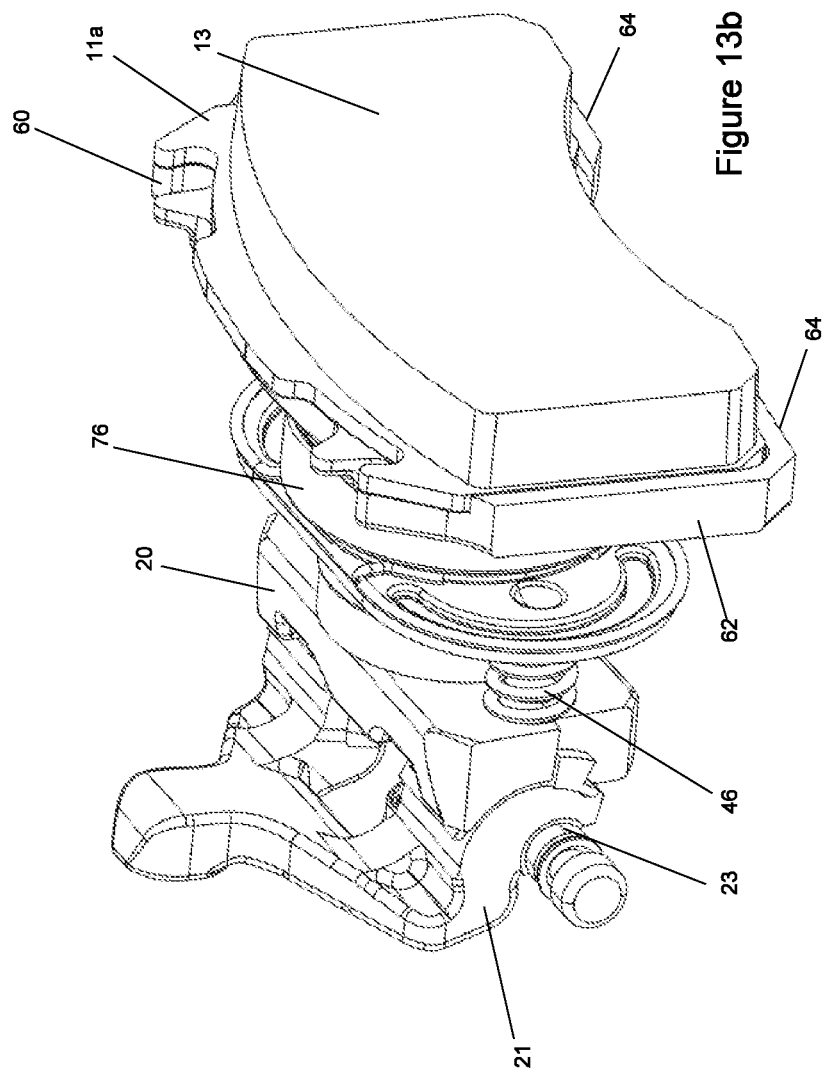

DISC BRAKE

TECHNICAL FIELD

The present invention relates to a disc brake. More particularly, but not exclusively, the present invention relates to an air actuated disc brake including an adjuster system for adjusting the position of a brake pad relative to a brake disc so as to maintain a suitable running clearance between the brake pad and the brake disc.

BACKGROUND

Many brakes, for use on heavy vehicles such as trucks and buses, have an adjuster mechanism to set the position of brake pads having friction material relative to a brake rotor, to account for wear of the friction material and the rotor in brake use. Generally, the adjuster mechanism has an adjuster shaft of which an end portion is accessible from the exterior of a brake housing and operable to manually re-wind or de-adjust the adjuster to permit removal and replacement of the brake pads, and/or other servicing procedures. In conventional adjuster mechanisms having such a de-adjustment facility, there is a danger of excessive manual de-adjustment of the mechanism leading to locking together, shearing, or other damage to internal components of the adjuster mechanism, resulting in the mechanism becoming inoperative in normal use.

One attempt to solve this problem has been to provide a weakness or rupture in the adjuster shaft of such a mechanism so that shearing takes place at a predetermined excessive torque applied to the shaft in the de-adjustment and adjustment direction. This is disadvantageous in that the sheared shaft has to be replaced, requiring stripping and re-building of the adjuster after each shaft shearing.

An alternative solution is described in GB2304387, which provides a shearable or permanently deformable element engageable with the shaft. The element shears or permanently deforms when a torque above a pre-determined torque is applied (but less than the torque that damages the adjuster mechanism), so as to prevent or reduce further torque application to the shaft. However, this arrangement requires that the element be replaced after the element has deformed or sheared.

EP2602505 discloses a further alternative solution where the arrangement includes an adjuster shaft having a portion for engaging a tool and a rewind tool. When a torque is applied to the tool that is above a pre-determined torque, the tool fails and torque is no longer transmitted to the adjuster shaft, to prevent damage to the adjuster arrangement. However, this arrangement requires a separate tool to fail, which then needs to be replaced next time an adjustment operation is required.

The present invention seeks to overcome or at least mitigate the problems associated with the prior art.

SUMMARY

A first aspect of the invention provides an adjuster system for a disc brake, the adjuster system comprising: a piston for applying an actuating force to a brake pad, the piston having a rotatable portion to adjust the running clearance between a brake disc and the brake pad; a manual rewind apparatus located within the piston and being in driving engagement with the piston such that when a torque is applied to the manual rewind apparatus, torque is transmitted to the piston; and an overload device arranged between the manual rewind apparatus and the piston, wherein the overload device is configured to interrupt the driving engagement between the manual rewind apparatus and the piston when the torque applied is above a predetermined value.

This arrangement helps to prevent damage to the adjuster system occurring during a manual rewind operation, if an excessive torque is applied. Further, the arrangement of the manual rewind apparatus within the piston also helps to minimize the size of the adjuster system, leading to packaging benefits and cost savings.

The overload device may be arranged radially intermediate the manual rewind apparatus and the rotatable portion.

As the overload device is arranged to be located in the radial gap between the manual rewind apparatus and the piston, the longitudinal length and manufacturing complexity of the manual rewind apparatus can be reduced, compared to some prior art arrangements as there is no need to include a torque limiting arrangement along the length of the apparatus.

The overload device may be an elastically deformable member.

As the overload device is elastically deformable, it is not a consumable component and can be reused; there is no need for it to be replaced if an excess torque is applied.

The radially inner surface of the rotatable portion may comprise at least one recess, and the elastically deformable member may be arranged to locate in the recess, to transmit the torque to the rotatable portion.

This arrangement provides a simple and reliable driving interface between the elastically deformable member and the rotatable portion.

The recess may be a longitudinal channel.

The provision of a channel permits the rotatable portion to move axially relative to the elastically deformable member, e.g., during brake application.

The apparatus may comprise a formation shaped so as to mechanically receive and retain the elastically deformable member.

The formation may comprise a recess or bore, and the elastically deformable member may be located in the recess or bore, preferably wherein the bore or recess in the shaft extends diametrically through the entire apparatus.

A bore or recess provides a convenient and secure mounting arrangement for the elastically deformable member.

The formation may be located at an outboard longitudinal end of the apparatus, optionally such that the elastically deformable member may be located in the formation with an interference fit to the end thereof.

The elastically deformable member may be a flexible member having first and second ends, and the radially inner surface of the rotatable portion may comprise a first recess and a second recess, the first end of the strip may be arranged to locate in the first recess and the second end of the member may be arranged to locate in the second recess, to transmit the torque to the rotatable portion.

The first and second ends of the member may drivingly locate in the first recess and/or the second recess only when the torque being applied to the shaft is below the predetermined value.

Once the torque is above the predetermined level the member flexes such that the ends disengage from the recess(es) and slip around the interior of the rotatable portion.

The member may comprise a central portion intermediate the first and second ends, and the first and second ends may be angled away from the central portion, relative to an axis that passes transversely through the center of the shaft.

The angled ends bias the torque such that the member slips at a lower torque in the rewind direction than in the adjustment direction. This helps to ensure that, for example, if the piston is located at the end of its travel, i.e., it is fully rewound, the natural friction within the system will not cause the member to slip if the piston is adjusted manually to close the rotor gap again after a pad replacement operation.

The first and second ends may be angled in an angular direction that is opposite the direction the shaft is rotated in when torque is applied to the manual rewind apparatus in a rewind direction.

The first end may be located at substantially 180 degrees from the second end.

The first and second ends may be angled at an angle of 0 to 60 degrees, preferably at an angle of 3 to 40 degrees.

The elastically deformable member may be a metal strip, preferably spring steel.

The adjuster system may further comprise an axial bore extending through the piston, the manual rewind apparatus being located within the bore.

The manual rewind apparatus may comprise a rotatable shaft.

The manual rewind apparatus may further comprise a head for driving engagement by a tool on the inboard end of the shaft thereof.

A second aspect of the invention provides a disc brake comprising an adjuster system according to the first aspect.

A head of the manual rewind apparatus may be arranged to be accessible at an inboard end of a caliper of the disc brake.

BRIEF DESCRIPTION OF THE DRAWINGS

Embodiments of the present invention will now be described, by way of example only, with reference to the accompanying drawings, in which:

FIG. 12a shows a cross-sectional view through the inboard-outboard horizontal plane 7-7 of the brake of FIG. 1, but with an alternative manual adjustment arrangement of the present invention;

FIG. 12b shows a cross-sectional view through the inboard-outboard radial plane 6-6 of the brake of FIG. 1, but with the alternative manual adjustment arrangement of FIG. 12a;

FIG. 12c shows a detail view of a manual adjuster shaft of the alternative manual adjustment arrangement of FIG. 12a;

FIG. 12d shows a cross-sectional view through an end of a manual adjuster shaft, along a plane 12d-12d as shown on FIG. 12a, of a further alternative manual adjustment arrangement of the brake according to FIG. 1;

FIG. 13b is the same view as FIG. 13a but with the inboard brake pad included;

FIG. 15a is an isometric cross-sectional view through the inboard-outboard horizontal plane 7-7 of the brake of FIG. 1, with an alternative sealing arrangement according to an example;

FIG. 15b shows a plan view of the brake of FIG. 15a;

FIG. 17 shows an isometric view of a cover plate for sealing the housing bore of the caliper of the brake shown in FIG. 15a.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Actuation

Figure 1:
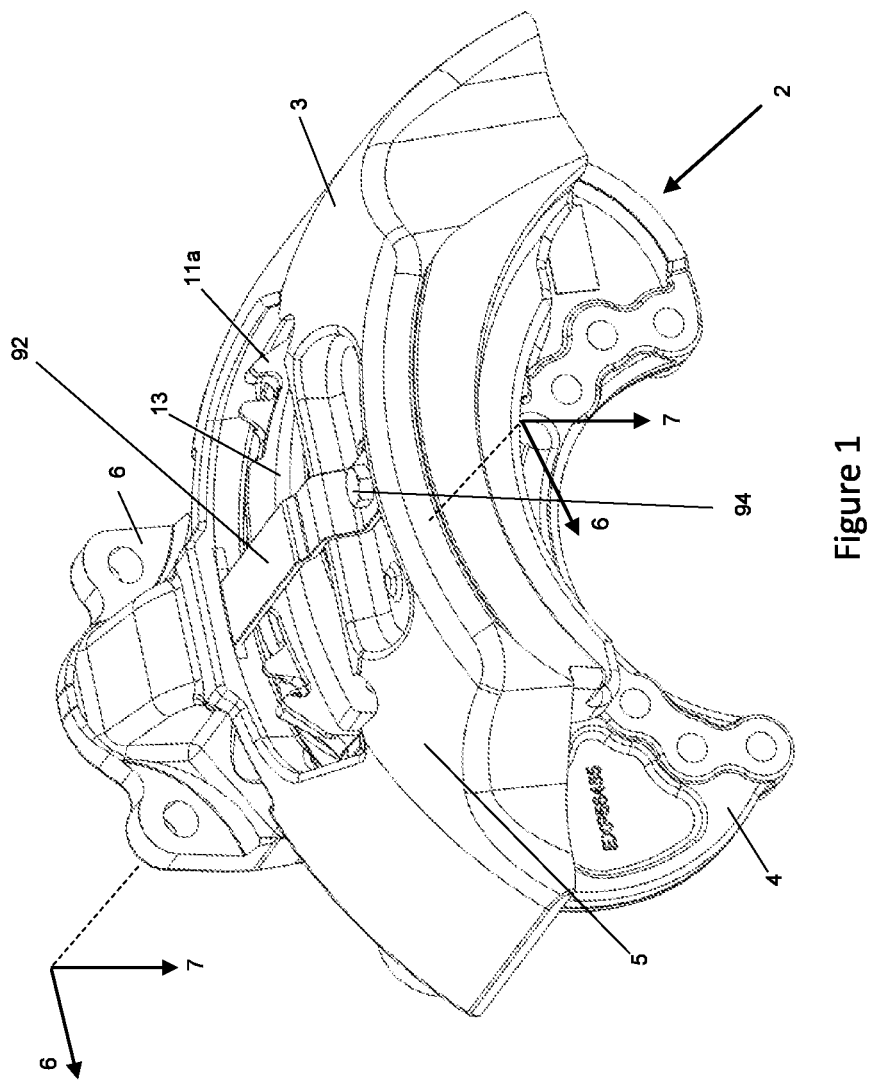
FIG. 1 is an isometric view of an example brake including inboard and outboard brake pads.
Figure 2:
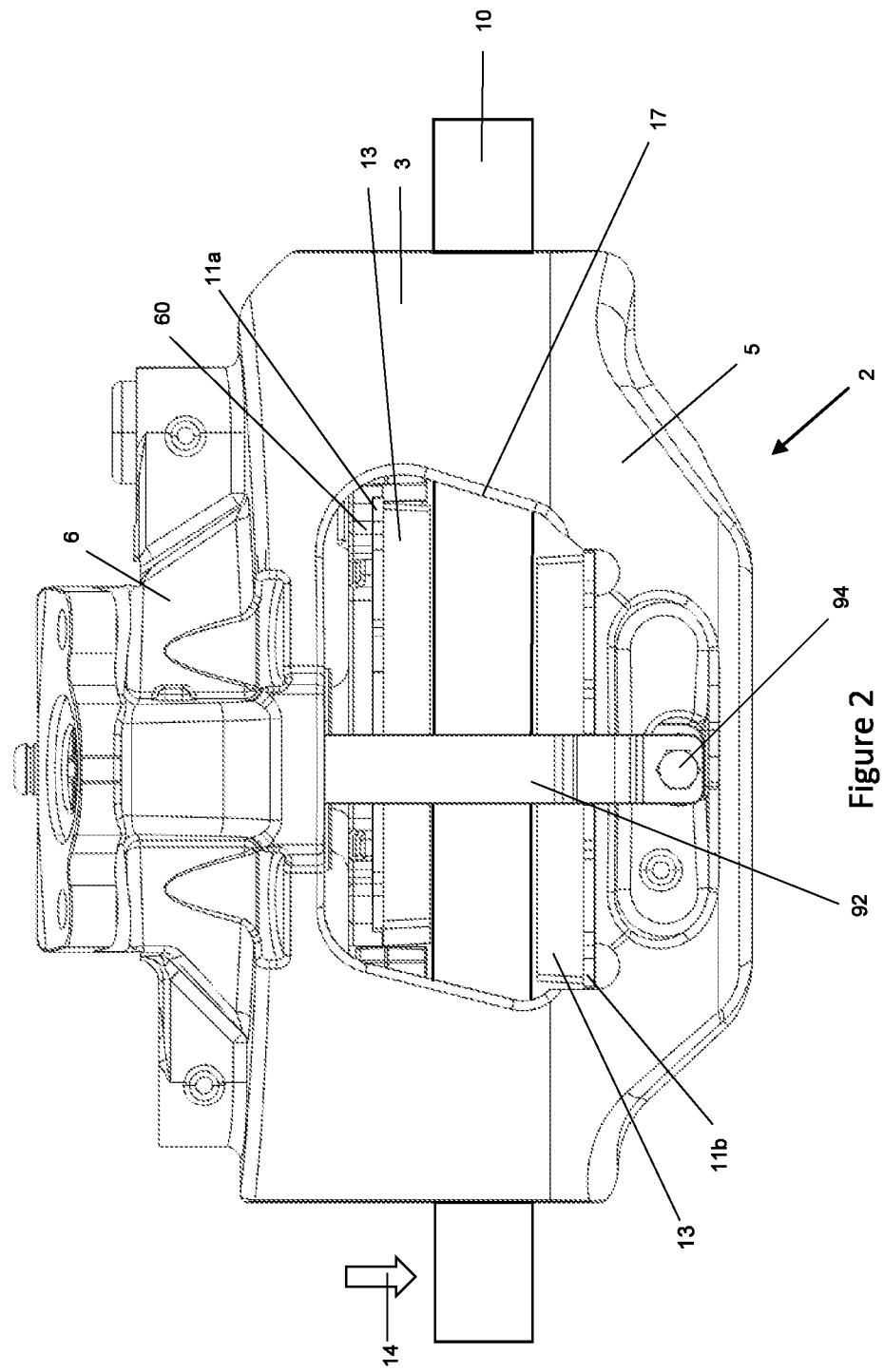
FIG. 2 is a plan view of the brake of FIG. 1, with a brake rotor in situ.
Figure 3:
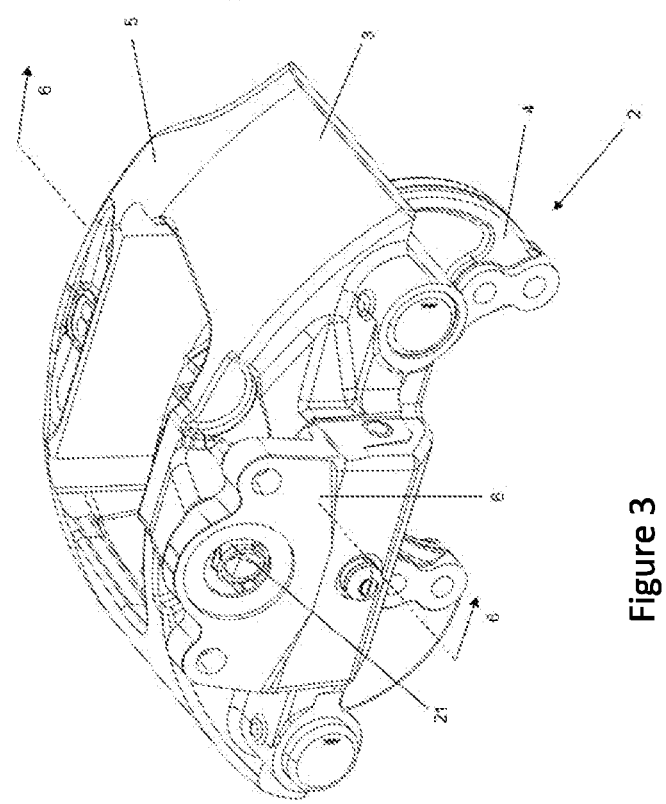
FIG. 3 is an isometric view of the brake of FIG. 1 from an inboard direction, with the inboard and outboard brake pads omitted for clarity.

FIGS. 1, 2 and 3 illustrate a disc brake 2. The disc brake incorporates an actuating mechanism comprising a single piston suitable for a commercial vehicle. This type of brake is particularly, but not exclusively, suitable for lighter duty heavy vehicles, for example smaller trucks, or a trailer of a tractor-trailer combination.

Various orientations of the disc brake are described. In particular the directions inboard and outboard refer to the typical orientation of the disc brake when fitted to a vehicle. In this orientation the brake pad closest to the center of the vehicle is the pad directly actuated by an actuation mechanism and being the inboard pad, and the outboard pad being one mounted to a bridge portion of the caliper. Thus, inboard can be equated with an actuating side of the disc brake, and outboard with a reaction side. The terms radial, circumferential, tangential and chordal describe orientations with respect to the brake rotor. The terms vertical and horizontal describe orientations with the disc brake mounted uppermost on an axle, whereas it will be appreciated that in use such a disc brake may adopt any axle orientation depending upon packaging requirements of the vehicle.

The disc brake 2 comprises a caliper 3 having a housing 6 to accommodate the actuation mechanism and which is slideably mounted on a carrier 4 for movement in an inboard-outboard direction.

Figure 4:
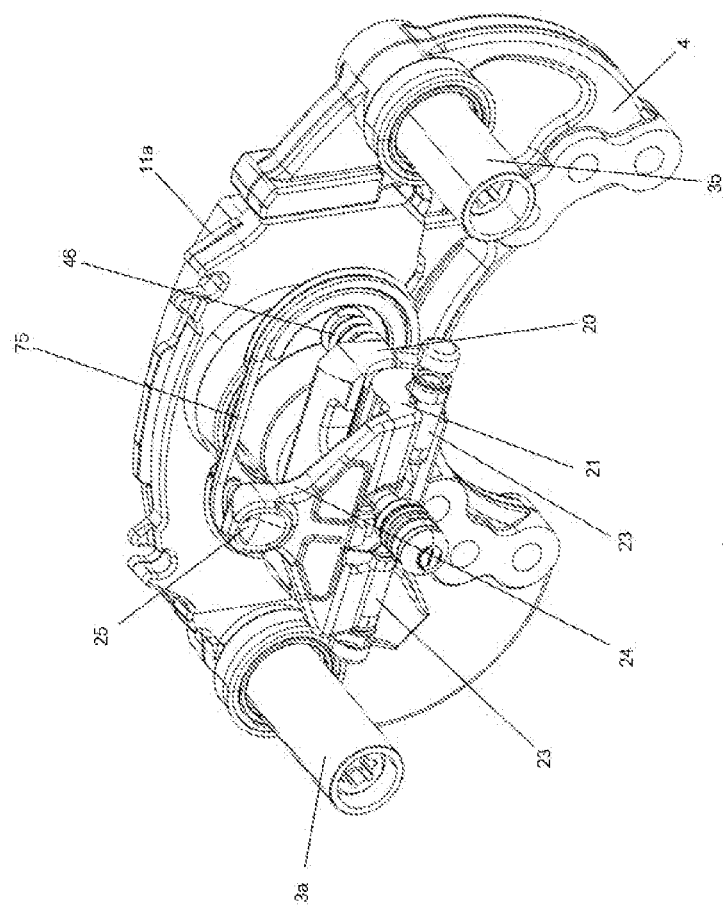
FIG. 4 is an isometric view of the brake of FIG. 1 from an inboard direction, with the outboard brake pad and a caliper housing of the brake omitted for clarity.

As can be seen from the view in FIG. 4 with the housing 6 omitted, the caliper 3 can slide on the carrier 4, by way of first and second guide pins 3a, 3b. In this embodiment, the first guide pin 3a is longer than the second guide pin 3b.

An inboard brake pad 11a comprises a layer of friction material 13 and is arranged so that the friction material 13 faces a brake rotor 10 (also known as a brake disc). The inboard pad 11a is mounted to a brake pad support arrangement. In this embodiment, the inboard brake pad support arrangement is a spreader plate 60, described in more detail below. The inboard pad 11a is moveable in the direction of arrow 14 (see FIG. 2) against the brake rotor 10 (example of rotor shown schematically in FIG. 2).

An outboard pad 11b, also with a layer of friction material 13, is also provided. The outboard pad 11b is mounted to a further brake support arrangement. A suitable arrangement is provided to urge an outboard brake pad 11b against the opposite side of the rotor 10. In this embodiment, such an arrangement comprises a bridge 5 arranged so as to straddle the rotor 10 and to transmit the reaction force from an inboard operating shaft 21 to the outboard pad 11b. In this embodiment the housing 6 and bridge 5 are manufactured as a single monolithic casting, but in other embodiments, the bridge 5 may be bolted or otherwise secured to the housing. In this embodiment, the inboard and outboard brake pads 11a, 11b are mounted asymmetrically across an axis parallel to the brake rotor 10. As described in more detail below, the inboard pad 11a is mounted in a position that is laterally offset from the actuation mechanism, i.e., the line of action of the actuation mechanism does not pass through the mid-point of the inboard pad in a circumferential direction. The outboard pad 11b is mounted directly opposite the actuation mechanism, i.e., it is not laterally offset; the line of action of the actuation mechanism does pass through the mid-point of the outboard pad 11b in a circumferential direction when the outboard pad 11b is mounted. The caliper 3 has an aperture 17, through which the inboard and outboard pads 11a, 11b can be inserted and removed in the radial direction.

Figure 5:
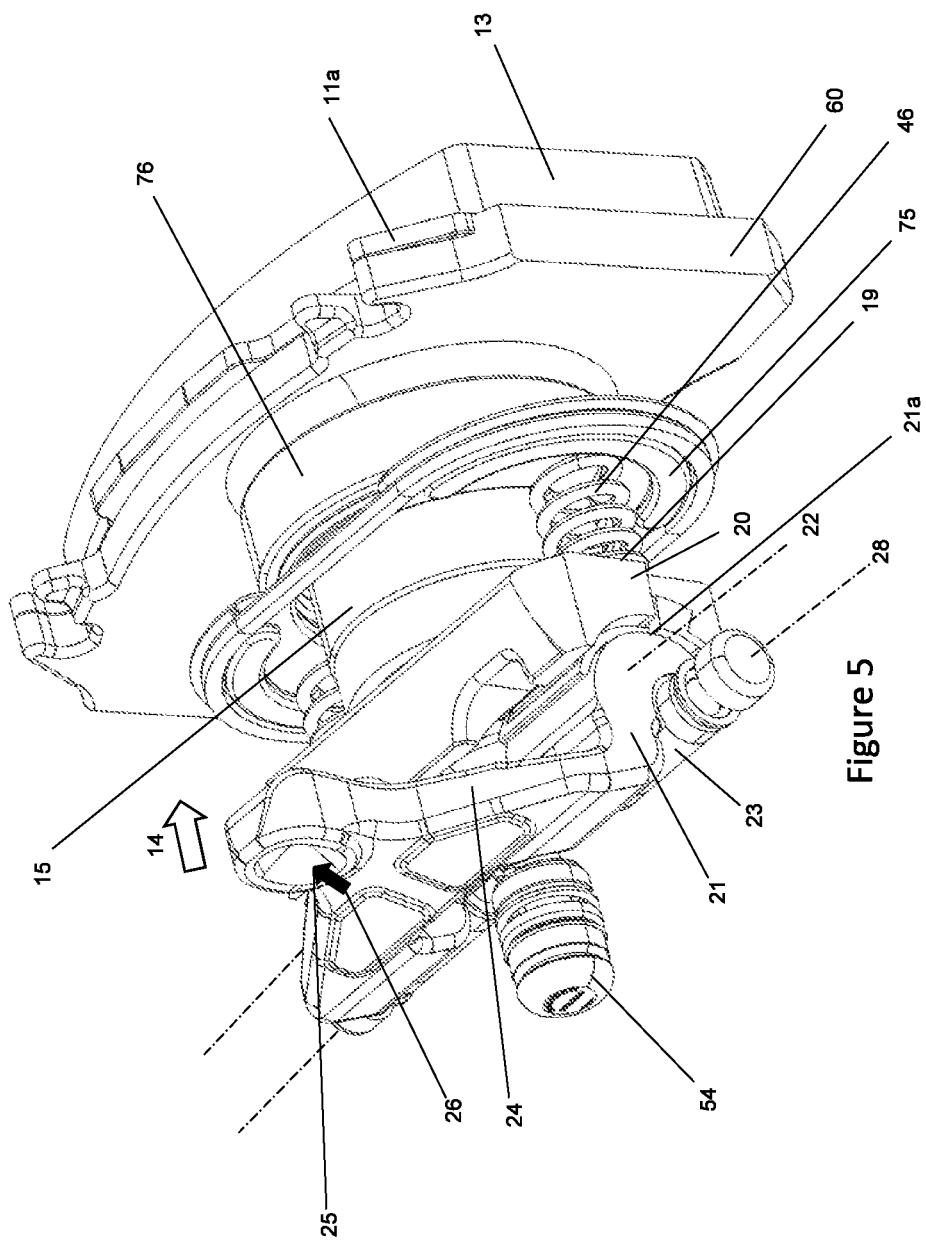
FIG. 5 is an isometric view showing an actuator arrangement of the brake of FIG. 1, with the inboard brake pad included.
Figure 6:
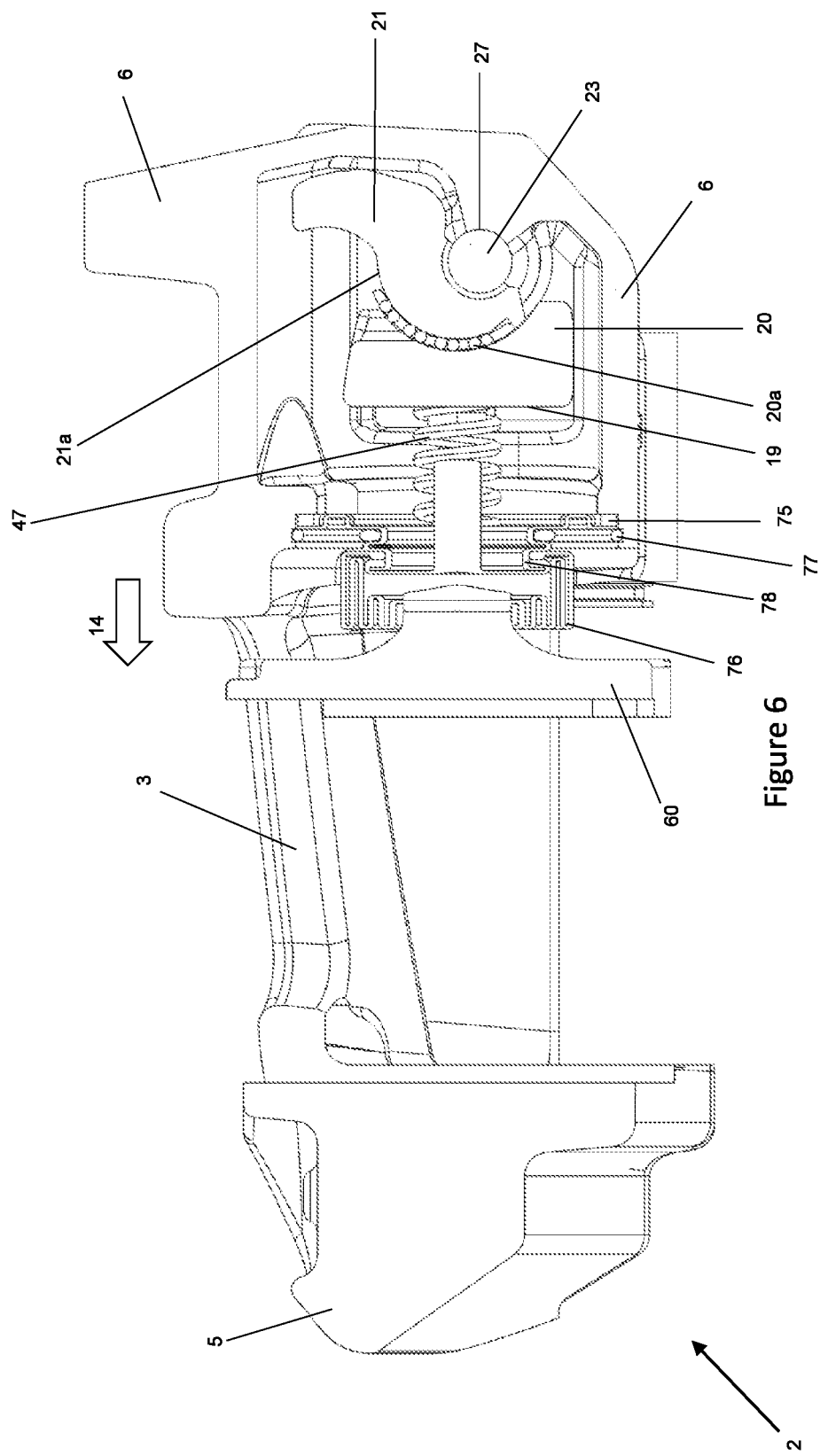
FIG. 6 is a cross-sectional view through an inboard-outboard radial plane 6-6 of the brake of FIG. 1, with no brake pads included.

With reference to the cut-away view of FIG. 5 and cross-section of FIG. 6 in particular, the inboard actuation mechanism comprises a single brake piston 15 (not shown on FIG. 6 for clarity), slideable in the direction of arrow 14 (i.e., inboard-outboard) relative to the rotor 10 (not shown in FIG. 5, for clarity).

In order to urge the piston assembly in the direction of arrow 14, the operating shaft 21 is pivoted about rollers 23 which are located along a transverse axis 28. In this embodiment, there are two rollers 23, which are spaced from one another laterally. Each roller 23 is located on a single bearing surface 27, each surface 27 being curved to accept the roller 23. Convex surfaces 21a of the operating shaft 21 are located opposite the roller 23. The operating shaft has an axis of rotation 22, being the radial center of the arc defined by the convex surfaces 21a, which is parallel and offset from the axis 28. The curved surface 21a locates in a semi-circular recess of a yoke 20. A surface 19 of the yoke 20 opposite the recess is in contact with an inboard end face of the piston 15. The operating shaft 21 further comprises a lever 24 having a pocket 25 adapted to receive an output push rod (not shown) of a brake actuator (e.g., an air chamber). The lever 24 is, in this embodiment, shaped as an inverted "U" (see FIGS. 4 and 10 in particular) and the line of action of the brake actuator (from pocket 25) is substantially over the line of action of the piston 15.

Located between the curved surface 21a and the recess of the yoke 20, on either arm of the 'U' are needle roller bearings 20a, to enable the operating shaft 21 to pivot around the roller 23, in the recess of the yoke 20.

In other embodiments, another form of cam surface instead of the curved surface 21a of the operating shaft 21 may be employed (e.g., a plain bearing) and/or the arrangement may be reversed with the rollers 23 being in contact with the yoke 20, and the curved surface 21a being located in the recess of the caliper housing 6.

The yoke 20 further includes a sleeve portion 40, which projects axially outboard from the yoke 20. The yoke 20 has a through bore extending axially through its center, the bore also extending through the center of the sleeve portion 40. In this embodiment, the sleeve portion 40 and yoke 20 are separate components that are fixed together during assembly, in any suitable way, but in alternative embodiments the sleeve portion 40 and yoke 20 are integral.

Application of a force in the direction of arrow 26 (FIG. 5) causes pivoting movement of the operating shaft 21 about the rollers 23 and the curved surface 21a bears on the yoke 20. The offset axes 28 and 22 cause the yoke 20 to move in the direction of the piston 15, contacting the piston 15 and causing the piston 15 to urge the friction material 13 of the inboard pad 11a directly against the rotor 10. A reaction force from the operating shaft 21 is transmitted to the bearing surface 27 of the caliper 3 via the rollers 23 and is then transmitted to the outboard pad 11b via the bridge 5, with the friction material 13 of the outboard pad 11b being urged against the rotor 10, such that the inboard and outboard pads 11a, 11b clamp the rotor and effect braking through a frictional brake force. In this embodiment, it should be noted that the piston is not itself directly guided with the caliper. Rather, at the outboard end the position of the piston transverse its line of action is determined by interaction of a spreader plate with the brake carrier as described in more detail below.

Wear Adjustment

A wear adjuster mechanism 30 to maintain a desired running clearance between the rotor 10 and inboard and outboard pads 11a, 11b is described below. Generally, the operating shaft 21 is connected to a one-way clutch to transfer any rotation of the operating shaft beyond a predetermined degree. Between the one-way clutch and operating shaft are a driving link member, which is driven by the operating shaft, and a driven link member which is driven by the driving link member and drives the one-way clutch. The one-way clutch has a driving portion configured to rotate if the driven link member rotates, and a driven portion mounted on the driving portion, that is driven by the portion of the one-way clutch. With particular reference to FIGS. 7, 8, 9 and 10, in this embodiment the operating shaft 21 includes a sector of a bevel drive gear 33 which extends inwardly from the side thereof parallel to the axis of rotation 22. The drive gear 33 acts as the driving link member and is in driving engagement with a central driven bevel gear 34 that acts as the driven link member and is located between the two arms of the operating shaft 21, generally in line with the piston 15. The bevel gear 34 is in driving engagement with a drive drum 35 that is arranged concentrically with the piston 15 and acts as the driving portion of the one-way clutch. In other embodiments, a drive pin and slot arrangement may be used instead of the gear arrangement, e.g., a pin projecting inwardly from the operating shaft engages a slot that is in driving engagement with the drive drum 35, such that as the operating shaft pivots in use (function described in more detail below), the pin engages within the slot to cause the drive drum to rotate. Alternatively, the slot may be located on the operating shaft, and a pin may project outwardly from the drive drum 35, or a component in communication with the drive drum. In a further alternative arrangement, the pin projects axially inboard from a position offset from the axis of the drive drum, rather than inwardly/outwardly.

The drive drum 35 is made up of a collar portion 35a at its inboard end and an axially extending projecting 'finger' portion 35b, of a smaller diameter than the collar portion 35a, that extends outboard from the collar portion 35a, concentric with the piston 15. In this embodiment, located adjacent and outboard of the collar portion 35a of the drive drum 35, and concentric radially outward from the finger portion 35b of the drive drum 35, is a driven drum 37. The driven drum 37 acts as the driven portion of the one-way clutch and is mounted on the drive drum 35. The driven drum 37 comprises a plurality of axially extending recesses 38 which are arranged to accommodate corresponding lugs projecting radially inwardly from input plates 41a of a friction clutch 41. In other embodiments alternative arrangements for driving the clutch input plates are contemplated e.g., a different number of recesses, or projections rather than recesses. A wrap spring 39 is frictionally wrapped around outer circumferential surfaces of the collar portion 35a of the drive drum 35 and the driven drum 37, such that it bridges the two components and enables the two components to act as a one-way clutch. The wrap spring 39 can easily bridge the two components, as they are both cylindrical and have the same outer diameter at the location point where the wrap spring 39 engages. In other embodiments other suitable one-way clutches may be utilized, such as ball and ramp, or roller clutch/sprag clutch arrangements.

Figure 9:
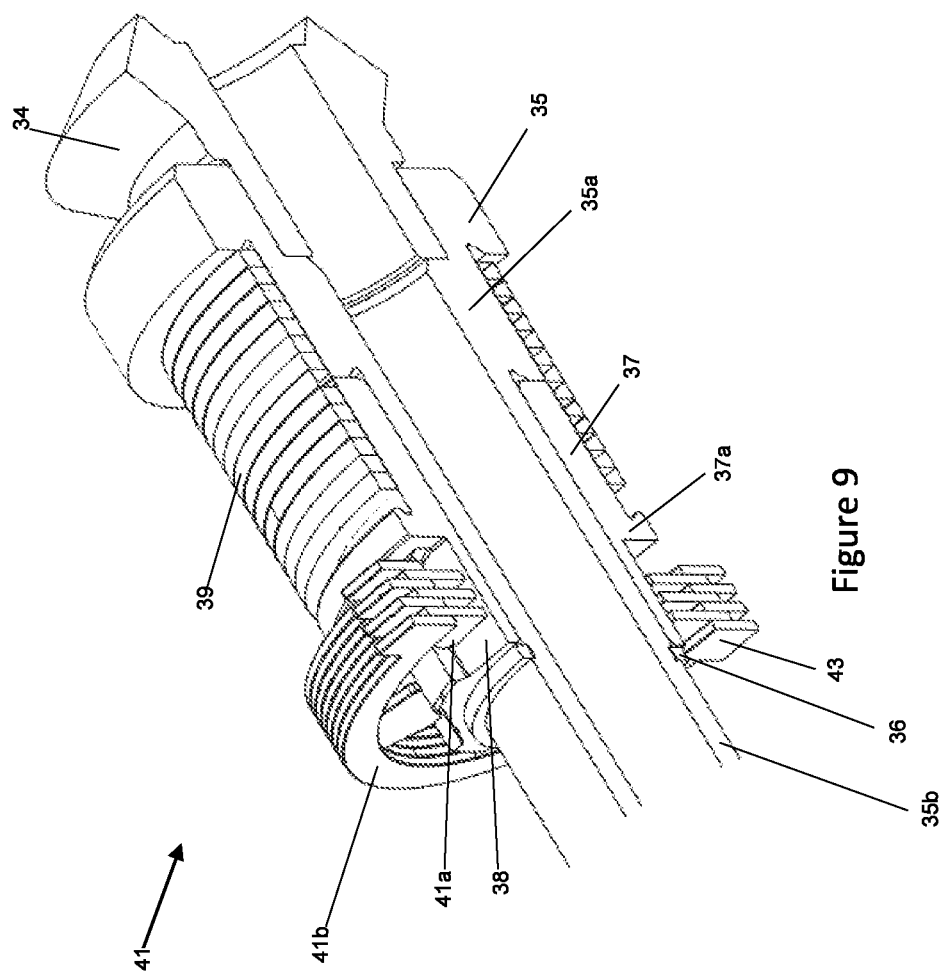
FIG. 9 is a detail view cut-away of an adjustment mechanism of the brake of FIG. 1, through the plane 9-9 as shown on FIG. 8.

The friction clutch 41 comprises output plates 41b positioned between the input plates 41a (see FIG. 9 for more detail). The output plates 41b of the friction clutch 41 have diametrically opposite radially outwardly facing lugs 43, which are not present on the input plates 41a. Alternatively, a ball and ramp arrangement could be used instead of a friction clutch with input and output plates, as is known in the art.

The driven drum 37 is retained relative to the drive drum 35 by a retaining ring such as a circlip 36 that is located in a recess in the outer surface of the finger portion 35b of the drive drum 35, adjacent the outboard end of the driven drum 37. A stop 44 projects radially inwardly from the inner piston 15b, adjacent and outboard of a circumferential shoulder portion 37a that projects radially outwardly from the driven drum 37. However, there is a clearance between the stop 44 and the shoulder portion 37a of the driven drum 37. The wrap spring 39 is retained in the axially outboard direction by the shoulder portion 37a of the driven drum 37, and in the axially inboard direction by the collar portion 35a of the drive drum 35.

Figure 7:
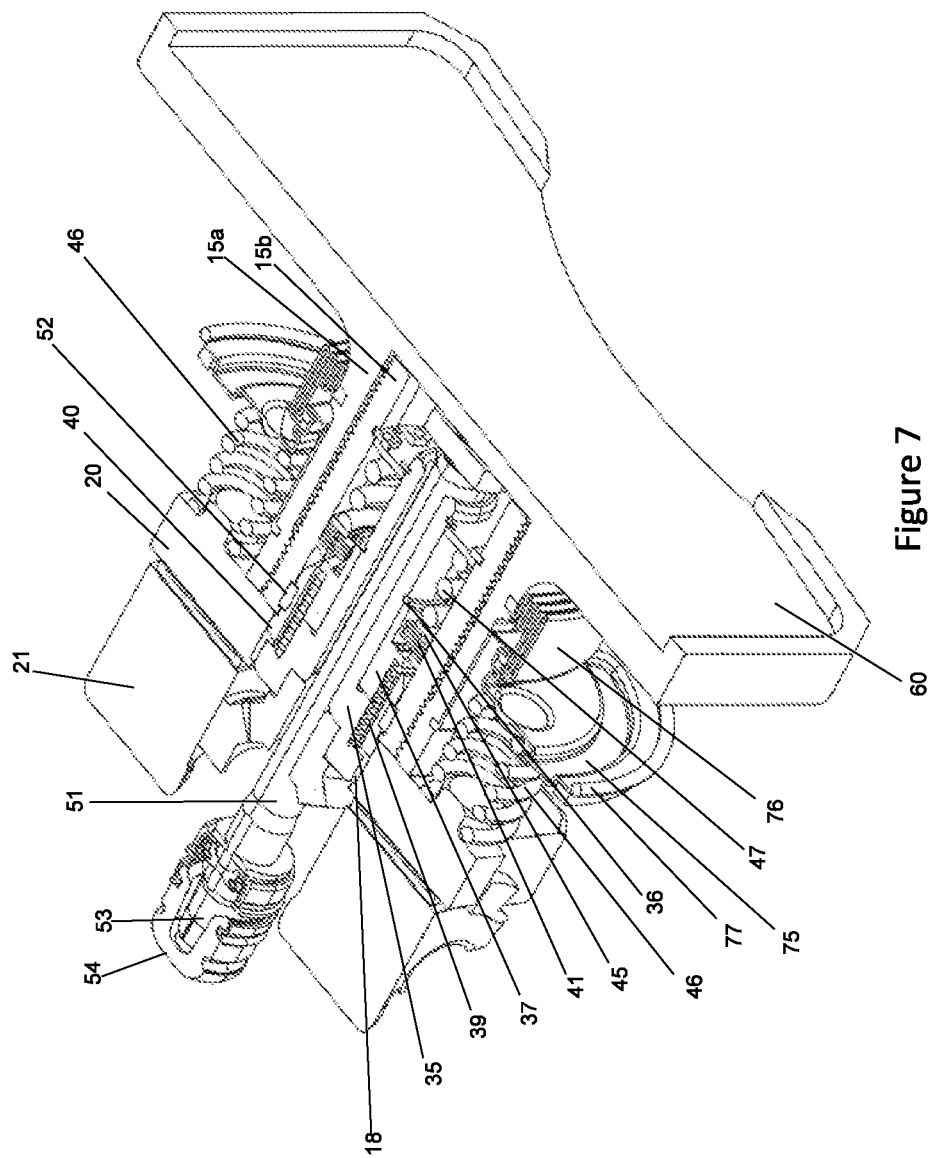
FIG. 7 is an isometric cross-sectional view through an inboard-outboard horizontal plane 7-7 of the actuator arrangement of the brake of FIG. 1.
Figure 8:
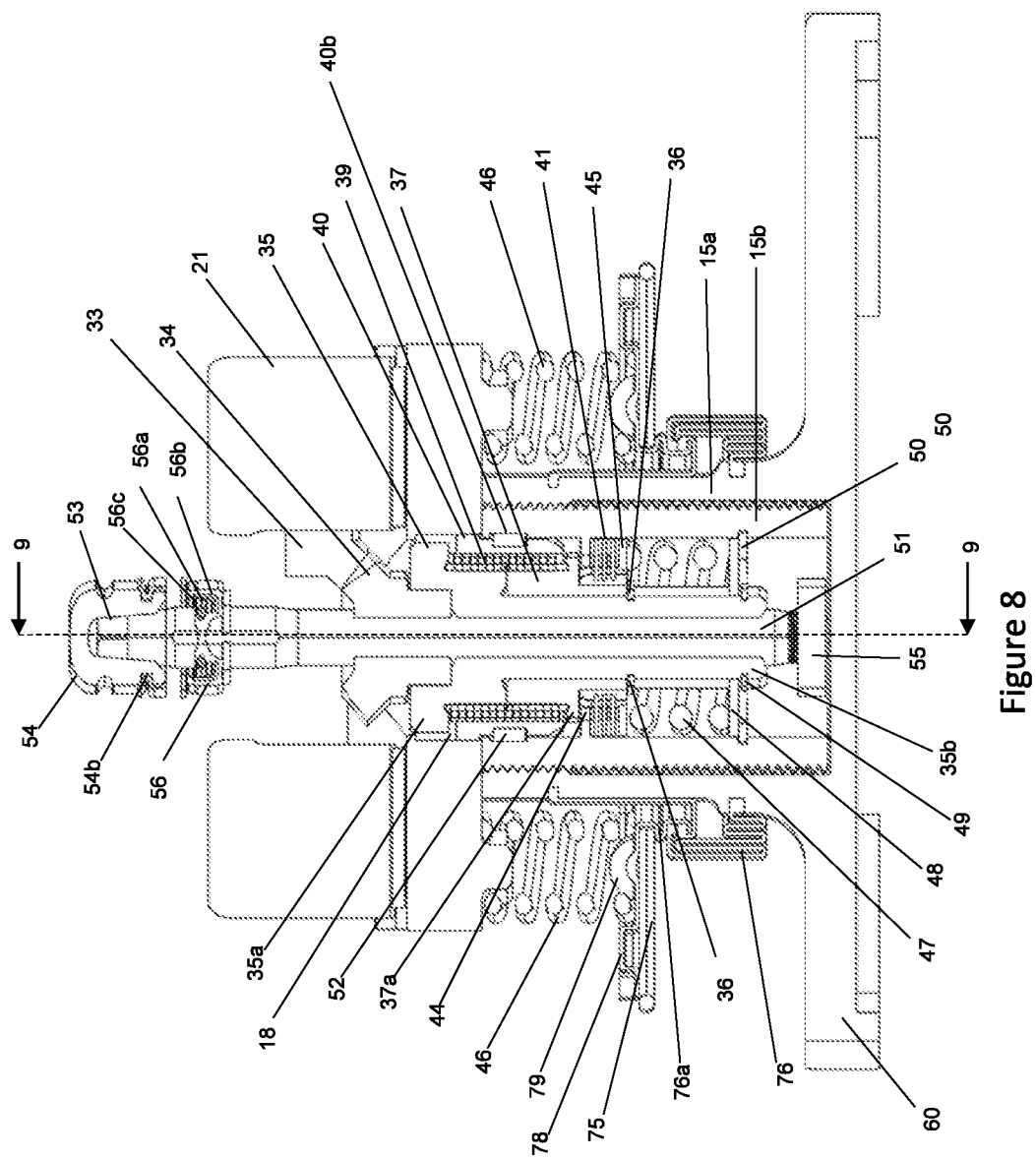
FIG. 8 is a plan view of the isometric cross-sectional view of FIG. 7.

As can be seen most clearly from FIGS. 7 and 8, the drive drum 35 is restrained from moving in an outboard direction by a bush 18. The bush 18 is an interference fit with the through bore of the yoke 20 and has a radially inwardly projecting lip at its outboard end, such that an L-shape is defined in cross section. An inboard surface of the lip engages the collar portion 35a of the drive drum 35, to retain the drive drum 35 from moving axially outboard, once the brake is assembled. The bush 18 also engages a radially outer surface of the collar portion 35a of the drive drum 35, to restrain the drive drum 35 from moving radially, and to take radial loads that pass from the bevel gear 34 through the drive drum 35. There is a clearance between the bush 18 and the wrap spring 39.

The piston 15 comprises an outer piston 15a having an internal female thread, and an inner portion or inner piston 15b, having a complimentary external male thread. Therefore, in this embodiment the inner piston 15b is located within the outer piston 15a. The inner piston 15b has at least one recess in its inner surface. In this embodiment, the recesses are two longitudinally extending channels 42 located diametrically opposite one another. When the adjuster mechanism 30 is assembled, the lugs 43 of the output plates 41b of the clutch 41 locate within the channels 42, to key the output plates 41b to the inner piston 15b. Therefore, rotation of the output plates 41b results in rotation of the inner piston 15b.

The components above, that are located between the operating shaft and inner and outer piston, define a transmission path of the wear adjuster mechanism 30.

When the adjuster mechanism 30 is assembled, the sleeve portion 40 of the yoke 20 is located concentrically between the wrap spring 39 and the inner piston 15b. The sleeve portion 40 is restrained from rotating, as it is secured to, or integral with, the yoke 20, which is also configured to be non-rotatable when assembled in the disc brake. However, as described in more detail later, the inner piston 15b is configured to rotate during an adjustment operation, to cause the piston 15 to advance in the direction of the inboard brake pad 11a. A friction element is located between the non-rotatable sleeve portion 40 of the yoke 20 and the rotatable inner piston 15b. The friction element helps to inhibit undesired vibration-induced torque from affecting the adjustment mechanism in operation, and causing undesired de-adjustment of the disc brake. Advantageously, the friction element provides a consistent friction torque but in a small space envelope.

The friction element is preferably configured to resist relative rotation of the yoke 20 and the inner portion 15b of the piston 15 with a torque greater than the torque required to cause the one-way clutch of the adjuster mechanism (in this case the wrap spring 39) to slip when the actuation force is released at the end of a braking operation. This helps to ensure that the one-way clutch slips rather than permits unwanted de-adjustment of the brake occurring during brake release.

In this embodiment, the sleeve portion 40 has a circumferential recess 40a on its external surface that is arranged to line up with a corresponding circumferential recess 40b on the internal surface of the inner piston 15b, adjacent the inboard end of the inner piston 15b. In this embodiment, the friction element is a radial expander 52, also known as a marcel expander. An example of suitable components may be those supplied by the Smalley Steel Ring Company of Lake Zurich, Ill., USA.

The radial expander 52 is located in the annulus defined by these recesses 40a, 40b. The radial expander 52 is a wave formed length of wire or metal sheet that has been formed into an open ring, which, as well as producing a radial force to provide resistance to rotation, retains the yoke 20 relative to the inner piston 15b axially. More specifically, the radial expander provides resistance to vibration induced torque that can occur during use of the brake, as well as helping to ensure that movement of the yoke in an axially inboard direction is transferred to the piston. For example, following a braking operation, when the actuation mechanism is reset, axial movement of the yoke results in axial movement of the piston. As the friction element itself retains the yoke relative to the second portion of the piston, there is no need for extra clips or other components, keeping the number of parts within the disc brake low. Further, because no additional clips are needed, manufacturing costs are reduced, as there is no need to machine the relevant features required for fitting clips to.

In this embodiment, the radial expander 52 is biased in both radial directions. In other words, the radial expander 52 is configured to exert a force in both a radially inward and a radially outward direction when constrained within the annulus, such that it contacts the radially outward facing surface of the recess 40a of the sleeve portion 40, as well as the radially inward facing surface of the recess 40b of the internal surface of the inner piston 15b, to provide a force and therefore a frictional resistance to the relative rotation of the sleeve portion 40 with respect to the radial expander 52 and of the inner piston 15b with respect to the radial expander 52. However, the radial expander 52 could alternatively be rotationally fixed to one of the inner surfaces, and only apply a frictional force to one of the surfaces. For example, the radial expander 52 could be rotationally fixed to the sleeve portion 40 and be biased in a radially outward direction only, i.e., the radial expander 52 could be configured to expand only in the direction of the internal surface of the inner piston 15b. In another example, the radial expander 52 could be rotationally fixed to the internal surface of the inner piston 15b and be biased in a radially inward direction only, i.e., the radial expander 52 could be configured to expand only in the direction of the sleeve portion 40.

To fit the radial expander 52, in this embodiment, the radial expander 52 is compressed, e.g., with a mandrel, before being inserted into the recess 40b of the internal surface of the inner piston 15b. The inner piston 15b would then be slid onto the outboard end of the sleeve portion in an inboard direction, until the radial expander 52 locates in the annulus defined by the recesses 40a, 40b.

In this embodiment, as can be seen most clearly in FIG. 8, the sleeve portion 40 has a chamfer at its outboard end, from the external surface of the sleeve portion 40 to the outboard face of the sleeve portion. This chamfer results in the outboard end of the sleeve portion 40 being tapered in an outboard direction. As the extreme outboard end of the sleeve portion 40 therefore has a smaller outer diameter than the remainder of the sleeve portion 40 that is inboard of the outboard end, fitting of the radial expander 52 is made easier, as the tapered external surface at the outboard end acts as a guide surface for fitting the inner piston 15b and radial expander 52 onto the sleeve portion 40.

The wear adjuster mechanism 30 additionally comprises a pressure plate 45 located outboard and engaging the friction clutch 41. An outboard face of the pressure plate 45 is acted on by a compression spring 47, the compression spring 47 being arranged concentrically between the pressure plate 45 and a washer 48 in order to load the friction clutch 41, and generate the required amount of friction to control the torque at which the friction clutch 41 slips. A retaining ring 49 is provided that is located in a circumferential recess in the outer surface of the projecting portion 35b of the drive drum 35, adjacent the outboard end of the drive drum 35. The ring 49 is an assembly aid, to help locate the adjustment mechanism during assembly, e.g., at a sub-assembly stage when all components are not yet installed. The washer 48 is retained by a retaining ring such as a snap ring 50, located concentric with and radially outward of the ring 49, and located in a circumferential recess in the inner surface of the inner piston 15b. In this embodiment, the snap ring 50 provides support for the washer 48, to help load the friction clutch 41. The washer also helps to radially locate the finger portion 35b of the drive drum 35.

In this embodiment, the outer piston portion 15a is integral (i.e., formed monolithically from the same material by casting, or forging, for example) with the spreader plate 60. The spreader plate 60 locates the inboard brake pad 11a, as well as engages surfaces of the carrier 4. Therefore, the interaction of the spreader plate 60 and carrier 4 prevent rotation of the outer piston 15a in use (described in more detail below).

In order to maintain a desired running clearance between the brake pads and rotor, the wear adjuster mechanism 30 is required to periodically advance the inboard brake pad 11a towards the rotor 10 to account for the loss of friction material 13, and to a lesser extent loss of material from the face of the rotor 10, due to wear.

A predetermined amount of play or backlash is provided in the system between the teeth of the drive gear 33 and the teeth of the bevel gear 34 (or between the pin and slot, or between the lugs of the input plates 41a of the clutch and the recesses 38, in other arrangements not shown in the figures). In a normal braking operation in which the running clearance is within the desired parameters, as the operating shaft 21 pivots, the play in the system means that no adjustment will occur.

If the running clearance is however greater than the desired range, the aforesaid play is taken up. Whilst there is excess running clearance to be taken up, this rotation is transmitted via the drive drum 35 to the wrap spring 39, causing the wrap spring 39 to rotate around the drive drum 35 and driven drum 37 in a direction which causes the wrap spring 39 to tighten, transmitting the rotation from the drive drum 35 to the driven drum 37. More specifically, this rotation is transmitted as the wrap spring bridges the two components, i.e., a first end of the wrap spring 39 engages an outer surface of the drive drum 35 and a second end of the wrap spring 39 engages an outer surface of the driven drum 37. Rotation of the driven drum 37 causes rotation of the input plates 41a of the friction clutch 41, due to the interaction of the recesses 38 and the lugs of the input plates 41a. Rotation of the input plates 41a results in rotation of the output plates 41b, due to the friction between the input and output plates 41a, 41b. As the lugs 43 of the output plates 41b engage the channels 42 of the inner piston 15b, the inner piston 15b is also caused to rotate.

Since the outer piston 15a is restrained from rotation by the engagement of the spreader plate 60 and the carrier 4, this causes a lengthening of the piston 15 to reduce the running clearance. At the point at which the friction material 13 comes into full contact with the rotor 10, the torque passing through the adjustment mechanism will start to increase. When this torque increases to a level that is higher than the maximum torque value of the friction clutch 41, the friction clutch 41 slips and further extension of the outer piston 15 is prevented. Once the braking operation ceases, return springs 46 act to urge the operating shaft 21 back to its rest position. A corresponding retraction of the inner piston 15b is prevented since the wrap spring 39 relaxes and does not transmit a reverse rotation to the driven drum 37.

Preferably, the radial expander 52 is configured to resist relative rotation of the yoke 20 and inner piston 15b with a torque greater than the torque required to cause the one-way clutch (in this case the wrap spring 39) to slip, when the actuation force is released at the end of a braking operation. This helps to ensure that the wrap spring 39 slips rather than permitting unwanted de-adjustment of the brake occurring during brake release.

The co-axial mounting of the adjuster mechanism 30 within the piston 15 minimizes the space required by the mechanism within the housing, resulting in a lighter, more compact housing.

As the wrap spring 39 directly engages the outer surface of the drive drum 35 and the driven drum 37, any potential backlash that may occur between the drive drum 35 and the wrap spring 39, or the driven drum 37 and the wrap spring 39, is minimized, which can help to reduce wear of the components. Uncontrolled unwinding of the wrap spring 39 is also minimized, which provides a more predictable, and hence controllable, friction level. The wear on the outer surfaces of the drums 35, 37 is also minimized. This could, for example, obviate the need to heat treat these outer surfaces, reducing manufacturing costs. The arrangement also helps to remove uncertainties that may arise after manufacturing of the components, for example unpredictable tolerances, which may affect the function of the system.

The shoulder portion 37a on the driven drum 37 and collar portion 35a of the drive drum 35 limits movement of the wrap spring 39 in the axially inboard and outboard directions, without the need for further separate circlips, or other similar retaining components.

Manual Rewind Apparatus

Once the friction material 13 has worn to its design limit, it is necessary for the inboard and outboard brake pads 11a, 11b to be replaced. In order to accommodate the extra depths of unworn new pads as compared to worn old pads, it is necessary for the piston 15 to be rewound back to its retracted position.

Figure 10:
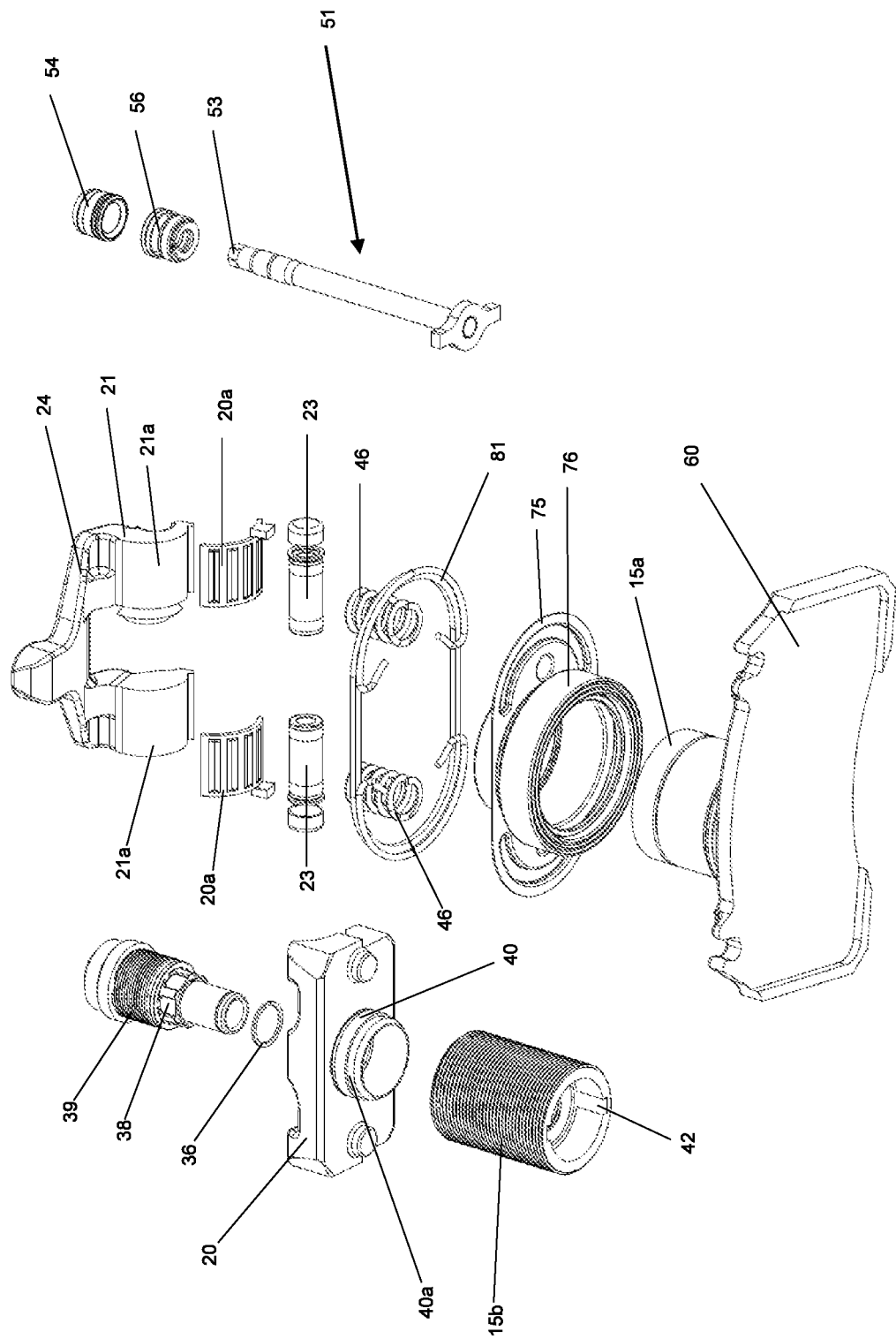
FIG. 10 is an exploded view of the actuator arrangement of the brake of FIG. 1.

To this end, a manual rewind apparatus incorporating an elongate manual rewind shaft 51 is provided (see FIGS. 7, 8 and 10). A hex head 53 or other suitable interface is provided at the outer (user accessible) longitudinal end of the rewind shaft 51. The hex head 53 has a cover 54, which is located on the hex head 53. In this embodiment, the cover 54 is a rubber cap. The cover 54 can be removed by a user when access to the hex head 53 is required. A spanner, wrench or other suitable tool may be attached to the hex head 53 to effect the rewinding operation.

Located outboard of the cover 54, is a collar 56. The collar 56 is generally annular and is configured to locate on the rewind shaft 51 adjacent the cover 54. The rewind shaft 51 is configured such that it can freely rotate within the collar 56 e.g., by use of one or more of suitable lubrication, coatings such as PTFE, or by the collar incorporating a lip seal that minimizes the contact areas between the collar and shaft. In this embodiment, the collar 56 includes a circumferential recess 56a facing inboard. Within the recess 56a are first and second sealing members 56b and 56c. In this embodiment, the first sealing member 56b is generally cup shaped, with a base having a central aperture, and sides projecting inboard, to define a general L-shape in cross-section on each side. The base of the sealing member engages with the collar 56 to substantially seal lubricant within the housing 6 of the brake and help prevent foreign material from contaminating the housing 6 of the brake. In this embodiment, the second sealing member 56c is a spring energized sealing ring that engages a slot in an internal surface of the recess 56a of the collar 56, to further help seal lubricant within the housing 6 of the brake, and help prevent foreign material from contaminating the housing 6 of the brake.

When the brake is assembled, the rewind shaft 51, collar 56, and cover 54 are located within a through bore, extending from an inboard surface of the caliper 3. The cover 54 is retained within the housing with a retaining member 54b, which locates within a circumferential slot on the external surface of the cover 54, between the cover 54 and the bore of the caliper 3. In this embodiment, the retaining member 54b is an annular retainer with an inner surface that engages the outer surface of the cover 54, and circumferential protrusion projecting radially inwardly and engaging the slot. Preferably, the retaining member 54b is metal.

Figure 11:
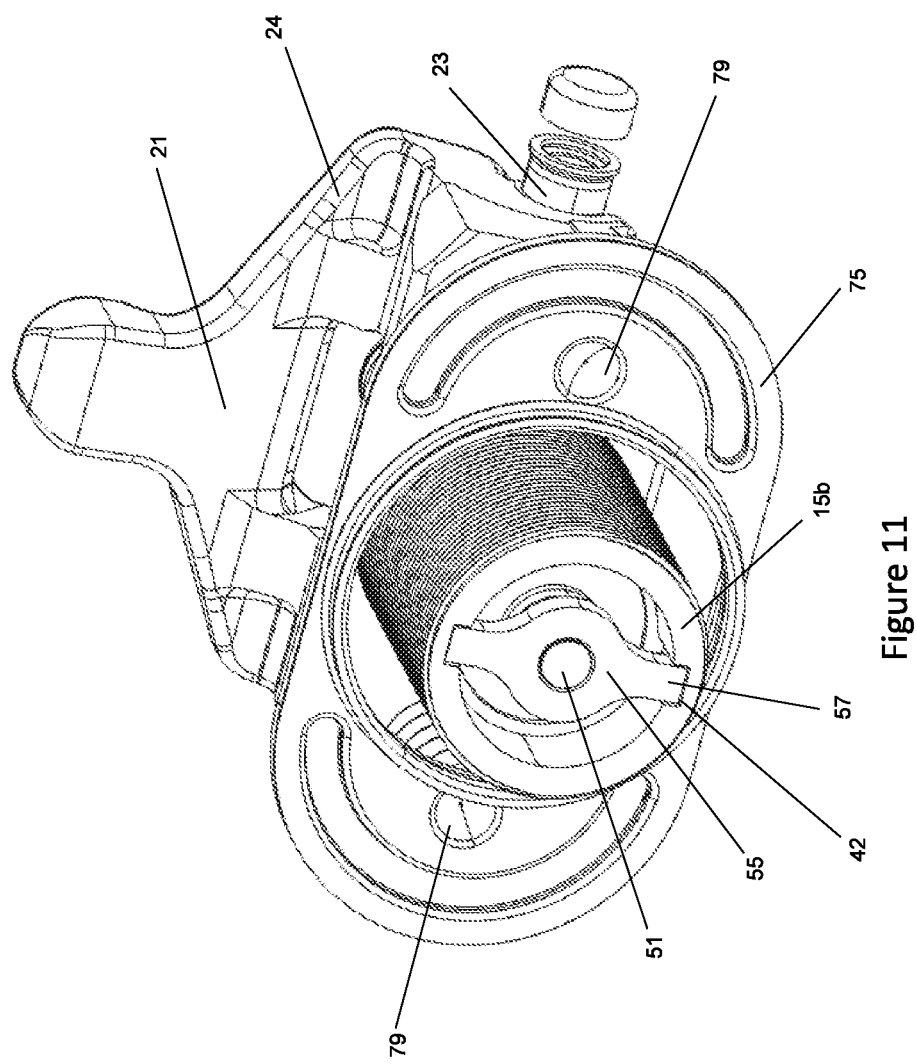
FIG. 11 is a detail view of an outboard end of a manual adjuster shaft of the brake of FIG. 1.

The rewind shaft 51 is mounted concentrically and radially inwardly with respect to the components of the adjustment mechanism 30. At the outboard end longitudinally opposite the hex head 53, a piston engaging end piece 55 is mounted on the rewind shaft 51. In this embodiment, the end piece 55 is circular in profile, with two diametrically opposed projections 57. As can be seen from FIG. 11, the end piece 55 and the projections 57 are dimensioned such that the projections 57 locate within the channels 42 of the inner piston 15b. The channels 42 allow the inner piston 15b to advance during a braking operation, whilst the rewind shaft 51 is axially fixed.

In use during manual adjustment therefore, a user rotates the hex head 53 to rotate the rewind shaft 51. Due to the engagement between the projections 57 of the end piece 55 and the channels of the inner piston 15b, the inner piston 15b is caused to rotate, rewinding the piston 15 back to its original retracted position.

Torque Limiting Arrangement

An alternative rewind mechanism arrangement of the present invention is shown in FIGS. 12A, 12B and 12C. Like parts are labelled by like numerals in FIGS. 12A to 12C by comparison with FIGS. 1-12. Parts that differ from FIGS. 1-12 have the suffix '.

When the adjuster mechanism is fully de-adjusted, the inner piston will 'bottom out' on the combined spreader plate and outer piston. In this embodiment, it can be seen in FIG. 8, that the outboard end surface of the inner piston 15b will engage an inboard surface of the spreader plate 60 when the adjuster mechanism is fully de-adjusted. Once this has happened, any further de-adjustment, e.g., by an impact wrench, can seriously damage the internal components of the adjuster mechanism.

Therefore, in the arrangement of FIGS. 12A, 12B and 12C, an alternative end piece arrangement is provided to act as an overload device. In this arrangement, the inboard longitudinal end has a diametric slit 55a' in its inboard surface. The slit 55a' has a sufficient depth relative to the inboard surface that it can house a strip 55'. In this embodiment, the strip 55' is generally rectangular in shape, with a length such that when the adjuster mechanism is assembled, longitudinal ends 57' of the strip 55' locate within the channels 42 of the inner piston 15b. Advantageously, the strip and slit arrangement is cheap to manufacture and easy to assemble.

As in the arrangement of FIGS. 7, 8, 10 and 11, in use, a user rotates the hex head 53 to rotate the rewind shaft 51. Due to the engagement between the longitudinal ends 57' of the strip 55' and the channels 42 of the inner piston 15b, the inner piston 15b is caused to rotate, rewinding the piston 15 back to its original retracted position.

However, in the arrangement of FIGS. 12a, 12b and 12c, the strip 55' also acts as a torque limiting arrangement, to prevent damage to the adjuster mechanism 30 if too high a torque is applied to the hex head 53.

The strip 55' is made of a deformable material such that, if a torque is applied to the hex head at a torque level in excess of the maximum desired torque level of the system, the strip 55' will deform, disengaging the longitudinal ends 57' from the channels 42. Therefore, rotation of the rewind shaft 51 will not be transmitted to the inner piston 15*b*, and no damage will be caused to the inner piston 15*b*, or other components of the adjuster mechanism, by the excessive torque applied. In preferred embodiments, the deformation is elastic, such that the strip can be considered an elastically deformable member and will return to its original shape when back in alignment with the channels 42.

After rotation of the rewind shaft 51 by 180 degrees, the longitudinal ends 57' will again drivingly engage the channels 42, so rewinding of the pads can continue. However, if the torque being applied is still too high, the strip 55' will again deform, and the rotation of the rewind shaft 51 will not be transmitted to the inner piston 15*b*. The longitudinal ends 57' will not drivingly engage the channels 42 until the torque being applied to the rewind shaft 51 is below the desired level, at which point the torque will be transmitted from the rewind shaft 51 to the inner piston 15*b*, to rewind the piston 15 and increase the clearance between the rotor 10 and the inboard pad 11*a*.

In this embodiment, the strip 55' is spring steel, but it will be appreciated that any suitably elastic material could be used. Also, in this embodiment, the strip 55' and slit 55*a'* are fixed to one another by way of a push fit arrangement, but it will be appreciated that alternative arrangements could perform the same function. For example, the strip 55' could be wrapped around the rewind shaft 51, welded to the rewind shaft 51, attached to the rewind shaft 51 by an adhesive, riveted to the rewind shaft 51, peened, pressed, formed, or any other suitable method used. The rewind shaft 51 and the strip 55' could be integral. The slit 55*a'* may not be necessary if one of these alternative arrangements are used.

Alternatively, instead of a strip and shaft arrangement, the end piece 55 could be a gear, and the projections 57 of the end piece 55 could be gear teeth that engage in corresponding recesses in the inner piston 15*b*. The teeth could be arranged to deform at a predetermined load, i.e., if a torque is applied to the hex head at a torque level in excess of the maximum desired torque level of the system. In a different embodiment, the gear itself could be configured to withdraw the gear teeth radially in at a predetermined load, for example by being like a governor and having linkages that bring the gear teeth in.

In a further alternative, the end piece 55 could be a shallow cone with a circumferential rim having projections 57 that engage with the inner piston 15*b*. If a torque is applied to the hex head at a torque level in excess of the maximum desired torque level of the system, the cone could deform elastically to define a sharper angle and prevent the projections 57 from driving the inner piston 15*b*.

In this this embodiment, the strip 55' is a planar rectangular shape. A further alternative arrangement, however, is shown in the schematic cross-sectional view of FIG. 12D. Parts that differ from FIGS. 12A to 12C have the suffix ".

In FIG. 12D, the strip 55" has angled longitudinal ends. The strip 55" is shaped such that a central portion locates within the slit 55*a"* of the rewind shaft 51", but the longitudinal ends 57", which are either side, axially, of the central portion, are angled away from the central portion. The longitudinal ends are angled relative to a transverse axis T-T that passes through the center of the rewind shaft. The longitudinal ends are angled to the axis T-T by an angle α.

Preferably, the angle α is 0 to 60 degrees. Even more preferably, the angle α is 3 to 40 degrees. In this embodiment, the longitudinal ends are angled in an angular direction opposite the angular direction R, which is the same direction that the rewind shaft is rotated during a rewind operation. This angled arrangement biases the torque such that the strip 55" slips at a lower torque in the rewind direction than in the adjustment direction. This helps to ensure that, for example, if the piston 15 is located at the end of its travel, i.e., it is fully rewound, the natural friction within the system will not cause the strip 55" to slip if the piston 15 is adjusted manually to close the rotor gap again after a pad replacement operation. The angle is chosen such that there is a sufficient angle for the strip to engage the channels 42 of the inner piston. If the angle is too great, then the strip will not engage with the channels 42 of the inner piston as they would just slip out as the shaft is rotated.

Alternatively, instead of a constant angle α, the angle could vary. In one embodiment, the angle could vary such that the strip is curved, e.g., to define an 'S-shape', in cross section, when looking from the outboard direction. In this case, adjusting would only be possible in one direction.

A further advantage of either the angled or curved arrangements is that strength in one direction is increased, which enables the strip to be made from thinner or cheaper material.

Mounting of Brake Pads

Figure 13A:
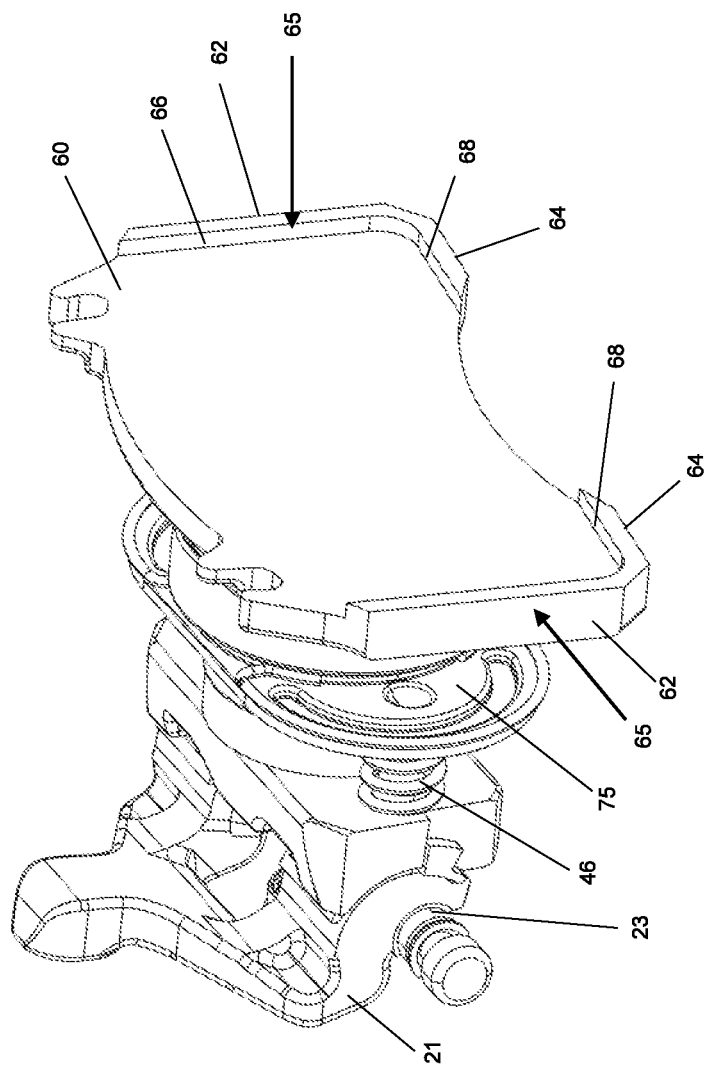
FIG. 13a is a detail view of a spreader plate and the actuator arrangement of the brake of FIG. 1, with no inboard brake pad included.

FIGS. 13A and 13B show the spreader plate 60 that is located on the inboard side of the rotor 10, the spreader plate 60 being shown both with and without an inboard brake pad 11*a*. As will be described, in use, the spreader plate 60 is configured to be guided by the carrier 4. For clarity, the carrier 4 is not shown in FIGS. 13A and 13B. The main function of the spreader plate 60 is to spread the load applied by the single piston across the circumferential width of the inboard pad 11*a*, which is particularly useful for high pressure applications (e.g., stopping a vehicle at high speed), to more evenly distribute the load applied to the pads, and help prevent brake fade. There is also an effect on wear; i.e., wear closer to the center of the pad (where the piston is applied) can be reduced, to provide a more even distribution of wear.

Figure 14:
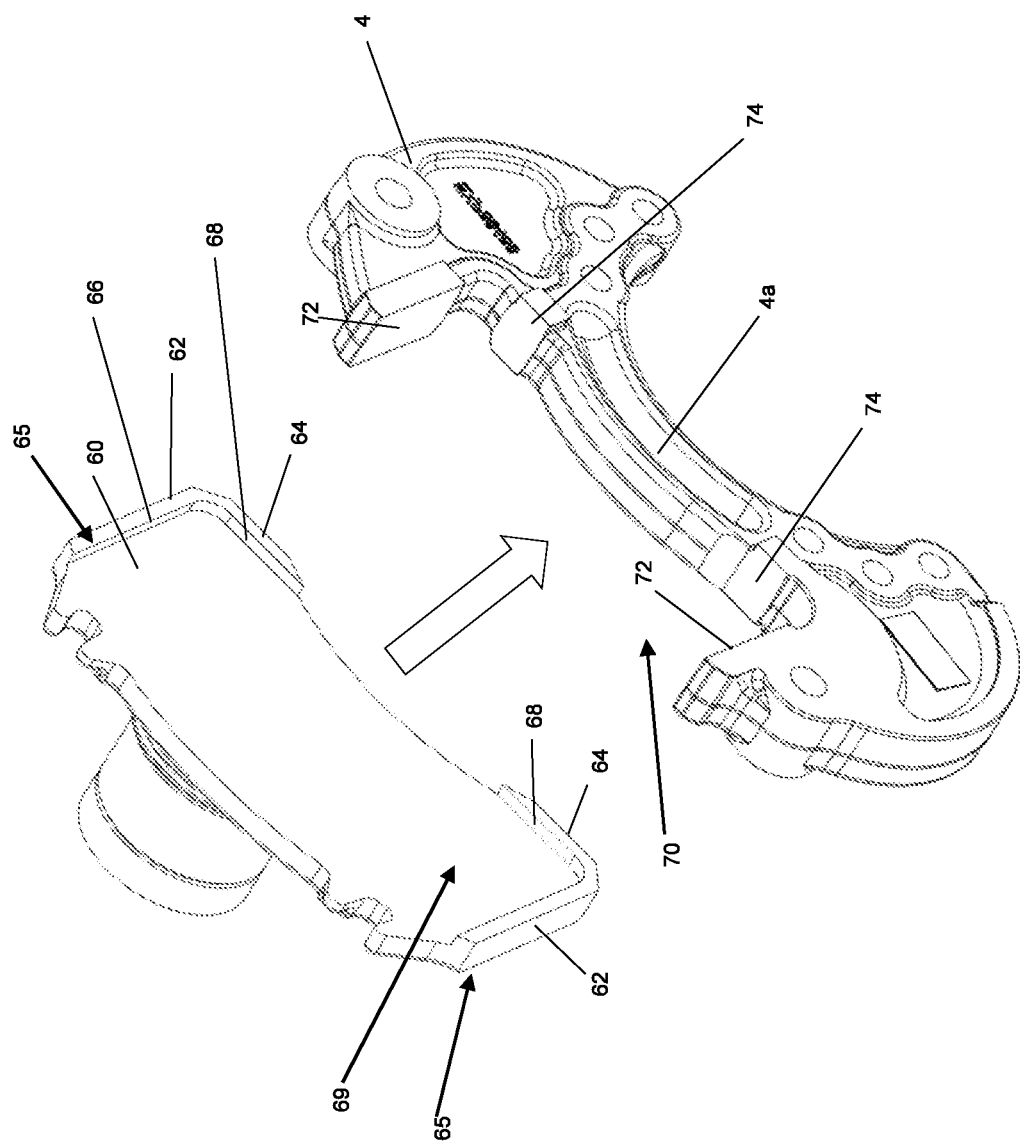
FIG. 14 is an isometric view of the spreader plate and carrier of the brake of FIG. 1, showing how the spreader plate fits within the carrier.

As can be seen most clearly in FIG. 14, the carrier 4 has a spreader plate opening 70, for locating the spreader plate 60. The opening 70 is arranged to support the spreader plate 60 in a circumferential (rotational about an axis passing through the center of the rotor and pads) direction, i.e., to provide a reaction force that reacts the circumferential forces created within the brake when the piston is actuated and the pads clamp the rotor.

Within the opening 70, the carrier 4 has opposing vertical spreader plate abutment surfaces 72, located on 'arms' that project radially outward from the left and right sides of the carrier 4 (the 'left' and 'right' directions being relative to the hub of a wheel, when the carrier 4 is mounted in use).

The carrier 4 also has horizontal spreader plate abutment surfaces 74, located either side of an arched 'link' portion 4*a* of the carrier, the link portion 4*a* connecting the left and right sides of the carrier 4.

When the brake is assembled, the vertical abutment surfaces 72 contact vertical outer side surfaces 62 of the spreader plate 60, and the horizontal abutment surfaces 74 contact horizontal bottom surfaces 64 of the spreader plate 60. This arrangement restrains rotation of the spreader plate 60. As the spreader plate 60 and the outer piston 15*a* are, in this embodiment, a single integral component, then the rotation of the outer piston 15*a* is also restrained. Therefore, when the brake is actuated in use, and when the brake is adjusted, the spreader plate 60 and outer piston 15*a* are restrained from rotating.

The spreader plate 60 has two side steps 65 projecting axially outboard from the outboard surface of the spreader plate 60. Each side step 65 extends down a vertical side edge of the spreader plate and across part of the horizontal bottom edge of the spreader plate 60, to define vertical pad abutment surfaces 66 and horizontal pad abutment surfaces 68.

Preferably, the vertical pad abutment surfaces 66 and horizontal pad abutment surfaces 68 are machined, but they could be forged, or just left as cast as desired. Typically, there is a tolerance of about 0.5 mm. Machining the surfaces enables them to be used as a datum during manufacturing.

The vertical and horizontal pad abutment surfaces 66, 68 define a first pad mounting structure in the form of an opening 69 that is arranged to support the pad in a radially inward and circumferential (i.e., rotational) direction. As the brake is actuated, the abutment surfaces 66, 68 react the torque that is created as the inboard pad 11*a* clamps the rotor 10. The abutment surfaces 66, 68 also act to locate the inboard brake pad 11*a*.

Advantageously, as the forces from the inboard pad 11*a* are reacted by the side steps 65, and these forces then passed directly to the abutment surfaces 72, 74 of the carrier 4, the backplate of the inboard pad can be made significantly thinner than the backplate of brake pads in brakes of the prior art. For example, a typical backplate may have a thickness of 7 to 10 mm, whereas a backplate used in combination with the spreader plate 60 could have a thickness of 5 mm, or even lower. It will be clear that the potential of being able to use thinner brake pad backplates would result in cost savings during manufacture of the pads and potentially an overall weight saving in the brake. Further weight/cost savings could be made by optimizing the brake support arrangements. For example, cut outs could be provided in areas of the spreader plate or caliper where forces in use will be lower, to save weight. The arrangement may also reduce the risk of relatively thin backplates and or carrier abutment surfaces being damaged due to impact loads etc. from vibrations and brake torque loads. Finally, the spreader plate arrangement for retaining the backplates means that, even for very thin backplates, the risk that a brake pad will fall through the gap between the spreader plate and the rotor (e.g., when the friction material and/or the rotor is heavily worn) is very low. This is a significant safety improvement.

Further, in other embodiments the backplate may be provided with alternative or additional formations to transmit the braking torque loads to the spreader plate 60, so that, provided the spreader plate projects beyond the edges of the inboard pad 11*a* the spreader plate transmits the load to the carrier. These formations may comprise for example projections from the rear face of the backplate into corresponding recesses of the spreader plate, or vice versa.

Further, instead of vertical and horizontal abutment surfaces, the surfaces may instead be angled to some degree, e.g., the radially outermost spacing between the generally vertical surfaces may be wider than the radially innermost spacing so a trapezoidal shape is formed. Further, the surfaces may be curved, e.g., so that the horizontal and vertical surfaces merge.

Sealing of Housing

To seal the adjustment mechanism 30 within the housing 6 of the caliper 3, a cover plate 75 seals an outboard opening of the housing 6. The cover plate 75 has a central bore 76, which the piston 15 passes through.

As shown most clearly in FIGS. 7, 8 and 10, a sealing boot 76*a* is located on the piston 15, outboard of the cover plate 75. The sealing boot 76*a* is convoluted and creates a seal between the bore 76 of the cover plate 75 and the outer surface of the outer piston 15*a*.

A circumferential seal 77 is provided between the cover plate 75 and the outboard opening in the caliper 3. The seal 77 generally follows the outer profile of the cover plate 75 and acts against the outboard surface of the housing 6 of the caliper and the cover plate 75 to inhibit contaminants passing through the space between the cover plate 75 and the caliper 3.

A secondary convoluted seal 78 is located inboard of the boot 76*a*, to further inhibit contaminants passing between the outer piston 15*a* and the cover plate 75, in the event that the primary seal fails. The circular profile of the piston and sealing arrangement means that effective sealing can be achieved without complex sealing arrangements. Alternatively however, other profiles of the piston and sealing arrangement can be used and still achieve effective sealing. For example, an elliptical profile could be used, or a substantially lobular profile.

The cover plate 75 has two half-spherical protrusions 79 projecting from its inboard surface. As can be seen from particularly FIG. 8, these protrusions 79 act as a seat for the outboard ends of the two return springs 46. The inboard ends of the return springs 46 are seated on outboard extending protrusions of the yoke 20, such that when a braking operation has ceased, the operating shaft 21 is pushed back to its rest position. In an alternative arrangement, a single seal could be provided on the outer surface of the piston, to act between the outer surface of the piston and an inner surface of the cover plate. Preferably, the seal would project in a radially outward direction.

A spring clip 81 is shown in FIG. 10, which retains the cover plate in an outboard direction in a mouth of the housing 6 of the caliper 3. Alternatively, axial bolts, or other suitable fixing components, could be used (not shown). If a spring clip is used, the cover plate would be prevented from moving too far in the inboard direction by the stepped arrangement to the mouth.

Figure 17:
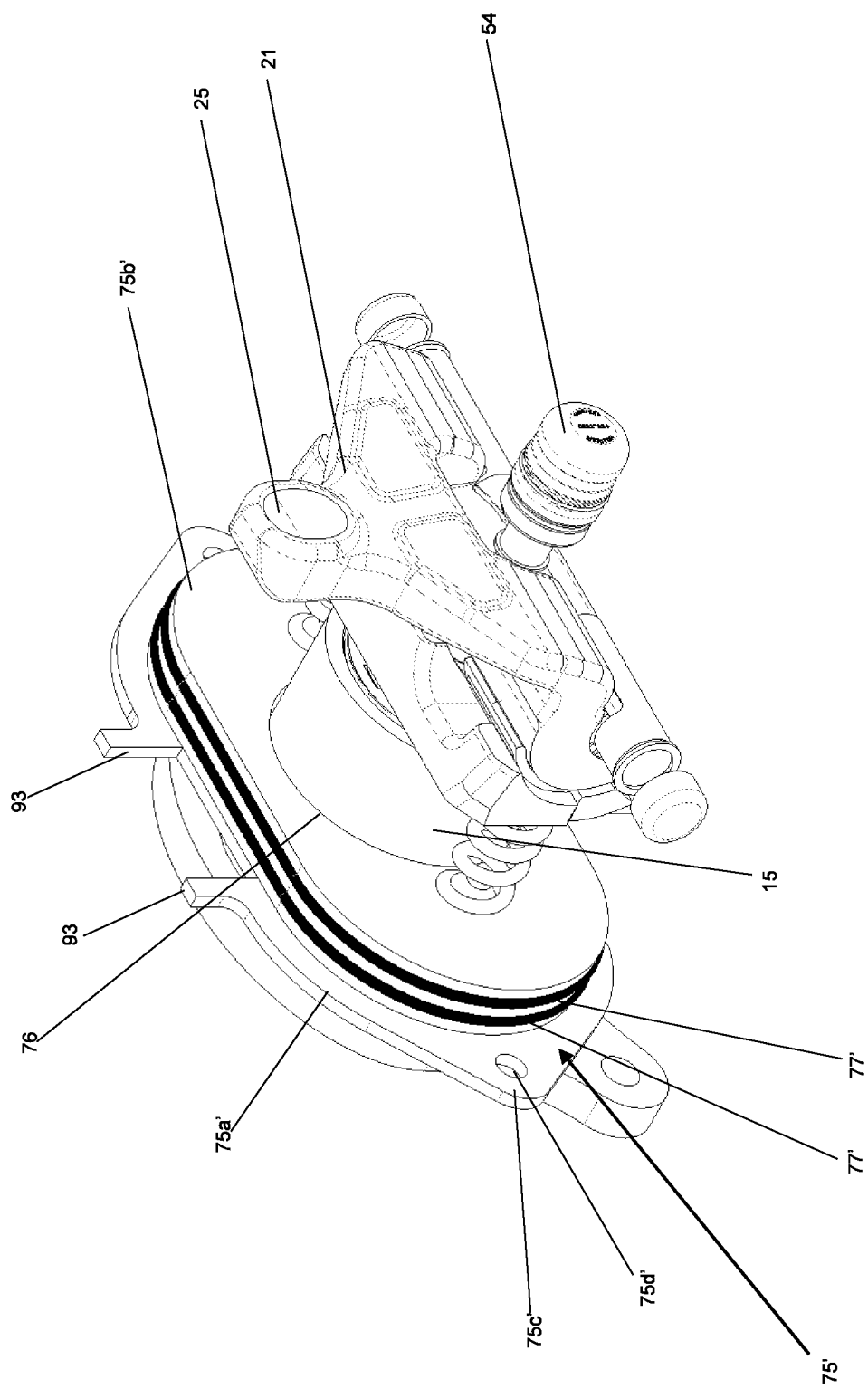

Alternatively, a radially-directed seal could be provided on the cover plate, as shown in FIG. 17. In this embodiment, an alternative cover plate 75' is provided. The cover plate has a flange portion 75*a*' that is substantially parallel to the orientation of the brake pads and faces of the rotor for engaging the outboard face of the housing 6 to limit movement inboard, and a portion 75*b*' projecting inboard from the flange, such that the portion 75*b*' projects through the opening in the housing 6 and locates within the cavity of the housing 6 of the caliper 3 and defines a radially outer surface that is normal to the plane of the flange portion and is substantially parallel to the inboard-outboard axis.

In this embodiment, the flange portion 75*a*' of the cover plate 75' has first and second lateral lugs 75*c*', which are configured to engage the outboard face of the housing 6 of the caliper 3. Each lug 75*c*' has a single aperture 75*d*' for locating a fastening member (not shown), such as a bolt or a rivet, to fasten the cover plate 75' to the outboard face of the housing 6 of the caliper 3. Therefore, the cover plate 75' is fastened to the outboard face of the housing 6 only at the lateral lugs 75*c*', to retain the cover plate 75' relative to the housing 6 in an outboard direction. In other words, the apertures are located circumferentially either side of the cover plate, so that the fastening members can be located in the outboard face of the housing portion circumferentially either side of the mouth of the housing cavity, to retain the cover plate relative to the housing portion in an outboard direction.

As only two fastening members are required to fasten the cover plate to the housing portion, assembly is simplified, as the location of the two fastening members means that they are easier to access, there are fewer fastening operations required, and less machining overall is necessary, all contributing to a reduced cost of manufacture.

First and second sealing elements 77' are located between the radially outer surface of the cover plate portion 75b' and the radially inner surface of the mouth of the cavity of the housing 6 of the caliper 3. The radially outer surface of the cover plate portion 75b' and the radially inner surface of the cavity of the housing 6 oppose one another. The sealing elements 77' inhibit contamination of the housing cavity. As the sealing elements 77' act between opposing surfaces of the cavity of the housing 6 and the cover plate portion 75b', the integrity of the seal is less affected by deformations of the outboard end of the housing cavity that can occur during the life of the disc brake. Further, the seal does not require a clamp loading generated by the fasteners to seal effectively. Therefore, environmental exposure is minimized, and the risk of failure and subsequent contamination of the housing cavity is reduced compared to arranging a gasket between the outboard face of the housing and a cover plate, as is normal in prior art sealing arrangements. Manufacturing costs may also be lowered, as the sealing faces may be in the same orientation as other internal faces of the housing cavity that require machining (such as guide surfaces of the yoke or operating shaft), so an additional machining operation to cut the sealing faces may not be required to be in an opposite direction, which would otherwise increase costs.

In an alternative embodiment (not shown), the cavity of the housing 6 tapers radially inwardly from the outboard face of the housing 6 in an inboard direction, and the portion 75b' of the cover plate 75' located within the cavity of the housing 6 tapers radially inwardly in an inboard direction. The tapered cavity of the housing 6 and tapered cover plate portion 75b' may help to increase the integrity of the seal as the fasteners may be used to apply a pre-load to the sealing interface, as well as help to self-center the cover plate portion within the housing cavity, to create an equal clearance around the entire circumference of the cover plate portion, and therefore a more consistent seal. In an alternative embodiment, only the cover plate portion 75b' is tapered, to create a seal with a non-tapered housing cavity. The angle of the taper may be in a range of 0° to 45° with respect to the fitting direction, preferably 0°-30°.

Each sealing element 77' can be mounted on the radially outer surface of the cover plate portion 75b'. In this embodiment, the radially outer surface of the cover plate portion 75b' has a first circumferential and a second circumferential recess. In this embodiment, the corresponding radially inner surface of the mouth of the housing has a straight profile inboard-outboard. In other embodiments, the radially inner surface of the mouth of the housing 6 may alternatively be provided with corresponding first and second circumferential recesses. In other words, the first recess of the cover plate portion 75b' may line up with the first recess of the cavity of the housing 6 and the second recess of the cover plate portion 75b' may line up with the second recess of the cavity of the housing 6, to define channels for locating the first and second sealing elements 77'.

Each sealing element is resilient such that, given an appropriate dimensioning of the seal in a relaxed state relative to the mouth of the cavity, the sealing element comes into contact with the radially inner surface of the mouth of the cavity, to create a seal.

The cover plate may be metallic, a composite, a high-temperature polymer, or any other suitable material. The cover plate could be suitable for being manufactured by casting, pressing, injection molding, or any other suitable process. In one embodiment the cover plate may be manufactured from sheet metal of a thickness of around 1 mm to around 3 mm.

In this embodiment, each sealing element 77' is a resilient sealing element, such as an o-ring. The o-ring may have a cross-sectional diameter of around 5 mm, which is reduced to 2-3 mm when the o-ring is under tension (due to being stretched around the cover plate portion 75b') and compression (from contact with the radially inner surface of the mouth of the cavity), when located between the cover plate and housing cavity. The clearance between the cover plate portion and the housing cavity should typically be between a loose running fit and a close running fit in accordance with ISO standards. E.g., for a close running fit the clearance may be approximately 0.1-0.2 mm.

In other embodiments though, each sealing element could be an extruded seal, an energized gasket with a metallic frame, or an over-molded sealing element. In the case of an extruded seal, in some embodiments, the cover plate may be fitted to the housing whilst the seal is "wet" and uncured, such that curing occurs in situ.

If the sealing element is resilient, an outer perimeter of the sealing element may be greater than the circumference of the radially inner surface of the housing cavity. In this case, the sealing element must be compressed to install the cover plate in the housing, helping to ensure that there is contact between the inner surface of the housing cavity and the sealing element, to increase the reliability of the seal.

The cover plate further includes a pair of integral radially upward projecting fingers 93, to define a radially upward facing depression, for locating the pad retaining strap 92. The depression helps to ensure that the pad retaining strap 92 is restrained in the circumferential direction, without a separate component being required. As best seen in FIG. 2, a bolt 94 (or other appropriate fastening component) passes through the pad retaining strap 92 and into a threaded bore in the carrier 4, to releasably secure the pad retaining strap 92 in place. The bore 76 of the cover plate 75' could also be configured for guiding a supporting the piston 15 of the disc brake. Preferably, the clearance between the piston 15 and the bore 76 of the cover plate 75' is such that the piston 15 can freely actuate within the bore 76, without any guiding from the cover plate in normal operation but restrain radial movement of the piston when during storage and installation on a vehicle. In other embodiments the cover plate may be used to support and guide the piston 15 in normal operation, in particular in a radial direction. In one embodiment, the piston could have a bush, such as a nylon bush, to help ensure the piston is guided by and free to actuate within the aperture.

In alternative embodiments, the seal may be fitted to the radially inner face of the mouth, rather than the cover plate, and the number of seals may be increased or decreased as required. Whilst the use of only two mounting apertures and corresponding fasteners is described, in other embodiments a different number of apertures and fasteners may be provided, and in different locations. The cover plate may be provided with two or more apertures therein to receive two or more actuating pistons.

Adjuster Sealing

As described above, the components of the adjuster mechanism 30 are contained within the piston 15, i.e., a chamber 120 is defined concentrically within the inner piston 15b and the outer piston 15a, for locating the adjuster mechanism 30.

Figure 15:
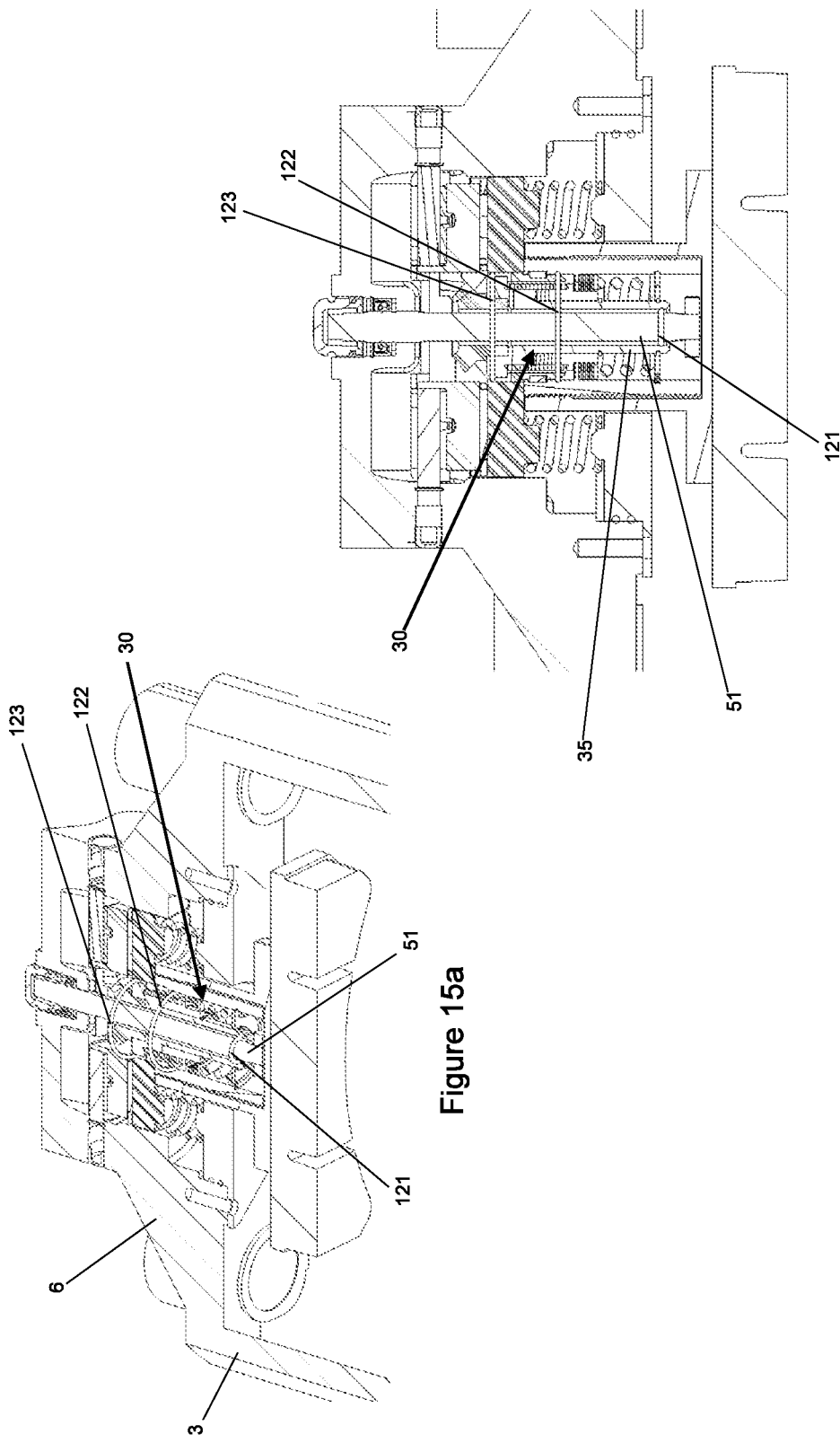

Looking now at FIGS. 15A and 15B, an arrangement is provided for substantially sealing the chamber 120. The chamber 120 is substantially fluid-tight, so as to hold oil, or other suitable lubricating fluid for lubrication of the adjuster mechanism.

At the outboard end, the inboard surface of the spreader plate 60 and the radially inner surface of the outer piston 15a define an inboard facing 'cup-shape' that locates the inner portion of the piston and adjuster mechanism and helps to ensure that lubricating fluid from the adjuster mechanism cannot escape in an outboard direction through the outboard end of the outer piston. The adjuster system of claim 2, wherein the cap and sleeve portion of the outer portion of the piston are integrally formed.

In embodiments where the spreader plate 60 and the outer piston 15a are integrally formed, no additional sealing components are required at the outboard end to prevent loss of lubricating fluid from the chamber 120 in an outboard direction.

The chamber 120 comprises an opening at its inboard end, and loss of lubricating fluid in an inboard direction through the opening is inhibited by at least one separate sealing member, which is located within, or immediately adjacent, the chamber. In this embodiment, a first sealing member 121, a second sealing member 122 and a third sealing member 123 are provided. The first sealing member 121 is located on the rewind shaft 51, between the rewind shaft 51 and the outboard end of the finger portion 35b of the drive drum 35. The second sealing member 122 is located on an outer surface of the sleeve portion 40 of the yoke 20, between the outer surface of the sleeve portion 40 and the inner piston 15b. The third sealing member 123 is located on the collar portion 35a of the drive drum 35, between the collar portion 35a and an inner surface of the through bore of the yoke 20. Suitable circumferential grooves would be provided in the components discussed above, to locate the sealing members.

Therefore, in use, a 'bath' of lubricating fluid is retained within the chamber 120, i.e., substantially no lubricant can pass inboard of the sealing member 121 and out through a potential fluid transmission path defined between the drive drum 35 and the manual rewind shaft 51, or inboard of the sealing member 123, through a potential fluid transmission path defined between the yoke 20 and the drive drum 35. The adjuster mechanism can be at least partially submerged in the 'bath' of the lubricating fluid. This reduces wear of the components of the adjuster mechanism, extending the life of a disc brake comprising this adjuster system.

In this embodiment, the sealing members 121, 122, 123 are elastomeric o-rings, but it will be appreciated that any suitable sealing members could be used with minor modifications to the sealing arrangement that would be within the remit of the skilled person, e.g., lip seals, u-cups, metal sealing discs, etc.

Figure 16:
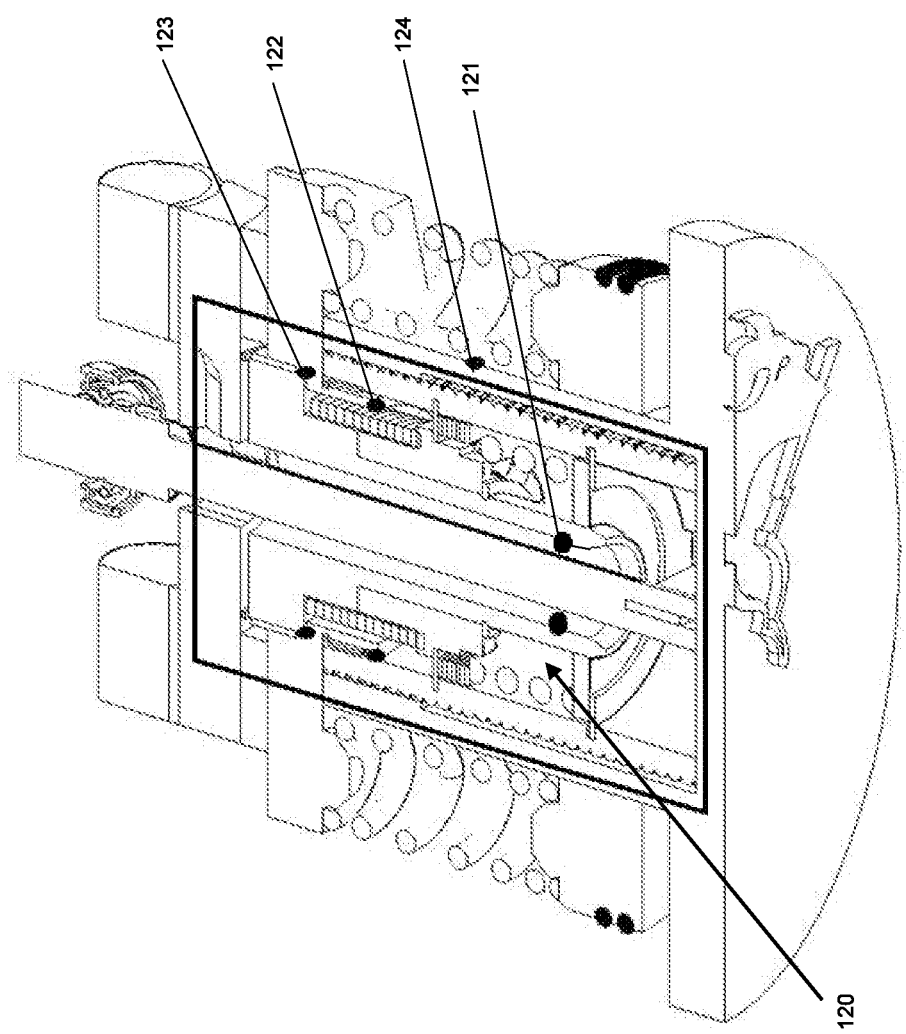
FIG. 16 shows a partly schematic view of a portion of the actuator arrangement of the brake of FIG. 15a, indicating the location of sealing members within the arrangement.

The chamber 120 is preferably not be completely air-tight, as pressure variations can occur due to extension of the piston 15 during adjustment and temperature changes within the brake in use. Therefore, an aperture such as a breather hole 124 is provided that passes from an outer surface of the outer piston 15a to an inner surface of the outer piston 15a. A possible location for the breather hole 124 is shown schematically in FIG. 16. The location is chosen such that there will be minimal loss of lubricant out of the breather hole 124. As the outer piston 15a does not rotate during use, a breather hole 124 in a radially upper half of the outer piston 15a is preferable. It is preferable that lubricating fluid be filled to a level radially lower than the location of the breather hole 124, to help prevent fluid loss. Lubricant loss would only occur if the brake, or vehicle the brake is attached to, is stored upside down, which is unlikely to occur. To further help prevent lubricant loss, a valve which is configured to permit air to pass but prevent fluid, e.g., a bung or similar, could be located in the breather hole 124.

In alternative arrangements, the chamber 120 is not fluid-tight, but simply configured to contain lubricant for lubrication of at least part of the wear adjustment mechanism, and inhibit lubricant from migrating away from the wear adjustment mechanism. As the lubricant is inhibited from escaping from a defined location, it is restricted from migrating to other areas of the disc brake 2, reducing wear of the components of the adjustment mechanism, and extending the life of a disc brake 2 comprising this adjuster system. If the lubricant is grease or a lubricating oil, a higher quantity of lubricant can be maintained near the parts of the wear adjustment mechanism needing lubrication, such as the wrap spring and/or friction clutch plates. Thus, should there be a degradation or escape of the lubricant over time, a greater amount of lubricant will nevertheless remain in contact with the parts requiring lubrication.

One way to inhibit the lubricant is for the chamber and/or the wear adjustment mechanism to have a radial step arranged to define a barrier to inhibit the escape of lubricant in an inboard or outboard direction. For example, looking at FIGS. 7 and 8, the stop 44 of the inner piston 15b projects radially inwardly and is arranged in an inboard direction by the compression spring 47, such that it will engage the outboard face of the shoulder portion 37a of the driven drum 37. Therefore, any lubricant contained outboard of the stop 44 will be inhibited from escaping in an inboard direction past the stop. The pressure plate 45 could also be dimensioned to extend radially to a sufficient extent to overlap and perform the same function, i.e., inhibit lubricant from escaping.

As a disc brake is mounted in a fixed orientation on a vehicle, provision of a radial step tends to inhibit the escape of at least a portion of lubricant under gravity and may help to create a more tortuous path out of the chamber for lubricant in the event of lubricant being dislodged by virtue of the disc brake being subjected to vibration, jolts or the like. The radial step may advantageously extend around a complete circumference, such that a barrier exists irrespective of the orientation of the disc brake on a vehicle.

The chamber and/or the wear adjustment mechanism may also have first and second opposed interface surfaces having a spacing sufficiently small therebetween so as to act a barrier to inhibit the escape of lubricant in an inboard or outboard direction. As an example, the pressure plate 45 or the circlip 36 could be dimensioned to extend radially a sufficient extent to define only a small radial spacing between the two components, to inhibit lubricant from escaping. Alternatively, the sleeve portion 40 of the yoke 20 could extend further in the outboard direction, such that its radially inner surface opposes the radially outer surface of the shoulder portion 37a of the driven drum 37.

First and second opposed interface surfaces further improve the containment of lubricant within the chamber. The surfaces may be radially opposed or axially opposed.

The spacing required may be larger for relatively viscous lubricants such as grease, and a closer fit for thinner.

The chamber 120 may be provided as a unitary item with the wear adjustment mechanism, such that removal of the adjustment mechanism from the caliper housing 6 of the disc brake 2 also results in removal of the chamber therefrom, for maintenance or replacement.

It will be appreciated that numerous changes may be made within the scope of the present invention. For example, certain aspects of the invention may be applicable to other types of brake, such as twin piston or electromechanically actuated brakes (e.g., the brake pads and the carrier aspects).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjuster system for a disc brake, the adjuster system comprising:
    a piston for applying an actuating force to a brake pad, the piston having a non-rotatable portion and a rotatable portion for adjusting a running clearance between a brake disc and the brake pad;
    a manual rewind apparatus located within the piston and being in a driving engagement with the piston such that when a torque is applied to the manual rewind apparatus, torque is transmitted to the piston to rotate the rotatable portion of the piston to retract the rotatable portion relative to the non-rotatable portion of the piston; and
    an overload device arranged between the manual rewind apparatus and the piston;
    wherein the overload device is configured to interrupt the driving engagement between the manual rewind apparatus and the piston when the torque applied is above a predetermined value.

2. The adjuster system of claim 1 wherein the overload device is arranged radially intermediate the manual rewind apparatus and the rotatable portion.

3. The adjuster system of claim 1 wherein the overload device is an elastically deformable member.

4. The adjuster system of claim 3 wherein a radially inner surface of the rotatable portion further comprises at least one recess, and the elastically deformable member is arranged in the recess for transmitting the torque to the rotatable portion.

5. The adjuster system of claim 4 wherein the recess is a longitudinal channel.

6. The adjuster system of claim 3 wherein the manual rewind apparatus further comprises a formation shaped to mechanically receive and retain the elastically deformable member.

7. The adjuster system of claim 6 wherein the formation further comprises a recess or a bore, and the elastically deformable member is located in the recess or bore.

8. The adjuster system of claim 7 wherein the recess or bore extends diametrically through the entire manual rewind apparatus.

9. The adjuster system of claim 6 wherein the formation is located at an outboard longitudinal end of the manual rewind apparatus.

10. The adjuster system of claim 9 wherein the elastically deformable member is located in the formation with an interference fit to the outboard longitudinal end thereof.

11. The adjuster system of claim 3 wherein the elastically deformable member is a flexible member having first and second ends, and a radially inner surface of the rotatable portion comprises a first recess and a second recess, the first end of the flexible member being arranged to locate in the first recess and the second end of the flexible member being arranged to locate in the second recess for transmitting the torque to the rotatable portion.

12. The adjuster system of claim 11 wherein the first end of the flexible member drivingly locates in the first recess of the rotatable portion or the second end of the flexible member drivingly locates in the second recess of the rotatable portion only when the torque being applied to the manual rewind apparatus is below the predetermined value.

13. The adjuster system of claim 11 wherein the flexible member further comprises a central portion intermediate the first and second ends, and the first and second ends are angled away from the central portion relative to an axis that passes transversely through a center of the manual rewind apparatus.

14. The adjuster system of claim 1 further comprising an axial bore extending through the piston, the manual rewind apparatus being located within the axial bore.

15. The adjuster system of claim 1 wherein the manual rewind apparatus comprises a rotatable shaft.

16. A disc brake comprising:
    a brake disc;
    a brake pad; and
    an adjuster system that includes:
        a piston for applying an actuating force to the brake pad, the piston having a non-rotatable portion and a rotatable portion for adjusting a running clearance between the brake disc and the brake pad;
        a manual rewind apparatus located within the piston and being in a driving engagement with the piston such that when a torque is applied to the manual rewind apparatus, torque is transmitted to the piston to rotate the rotatable portion of the piston to retract the rotatable portion relative to the non-rotatable portion of the piston; and
        an overload device arranged between the manual rewind apparatus and the piston;
        wherein the overload device is configured to interrupt the driving engagement between the manual rewind apparatus and the piston when the torque applied is above a predetermined value.

17. The disc brake of claim 16 wherein a head of the manual rewind apparatus is arranged to be accessible at an inboard end of a caliper of the disc brake.

18. The disc brake of claim 16 wherein the overload device is arranged radially intermediate the manual rewind apparatus and the rotatable portion.

19. The disc brake of claim 16 wherein the overload device is an elastically deformable member.

20. The disc brake of claim 16 wherein the manual rewind apparatus further comprises a rotatable shaft.

* * * * *